United States Patent [19]
Kajiyama et al.

[11] Patent Number: 5,090,012
[45] Date of Patent: Feb. 18, 1992

[54] MULTIPLEX TRANSMISSION SYSTEM FOR USE IN A VEHICLE

[75] Inventors: Hiroshi Kajiyama; Osamu Michihira; Toshimichi Tokunaga, all of Hiroshima, Japan

[73] Assignee: Mazda Motor Corporation, Hiroshima, Japan

[21] Appl. No.: 525,840

[22] Filed: May 21, 1990

[30] Foreign Application Priority Data

May 22, 1989 [JP] Japan .................................. 1-126714

[51] Int. Cl.$^5$ ............................................. H04J 03/14
[52] U.S. Cl. ................................. 370/85.3; 375/95.2; 370/110.1; 371/47.1
[58] Field of Search ..................... 370/85.1, 85.2, 85.3, 370/95.2, 110.1; 371/47.1

[56] References Cited
FOREIGN PATENT DOCUMENTS

62-4658  1/1987  Japan .

Primary Examiner—Douglas W. Olms
Assistant Examiner—Ghebretinsae Temesghen

[57] ABSTRACT

A multiple transmission system for use in a vehicle, in which a second node having a control function sends an command to first nodes of an ordinary type when an transmission error higher than a certain level takes place or at certain time intervals to effect system refreshment which resides in the following operation. Each of the first nodes, which has received the command, sends its status information (e.g., the status of an input device element such as a sensor or switch) to the other nodes. The other nodes which receive this information initialize their status (e.g., the status of an output device element such as an actuator or a motor) according to the received status information.

20 Claims, 20 Drawing Sheets

| NODE | TWS | MT | --- | ------------ |
|---|---|---|---|---|
| COUNT | 0 | 2 | --- | ------------ |
F I G. 11
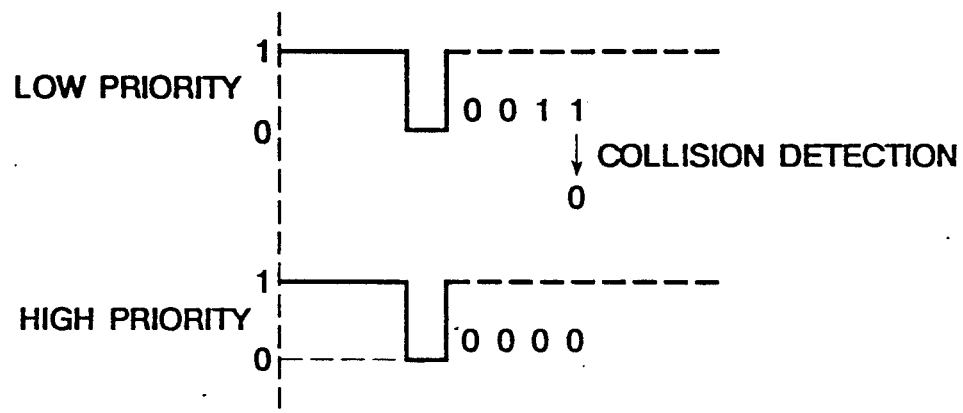
F I G. 13
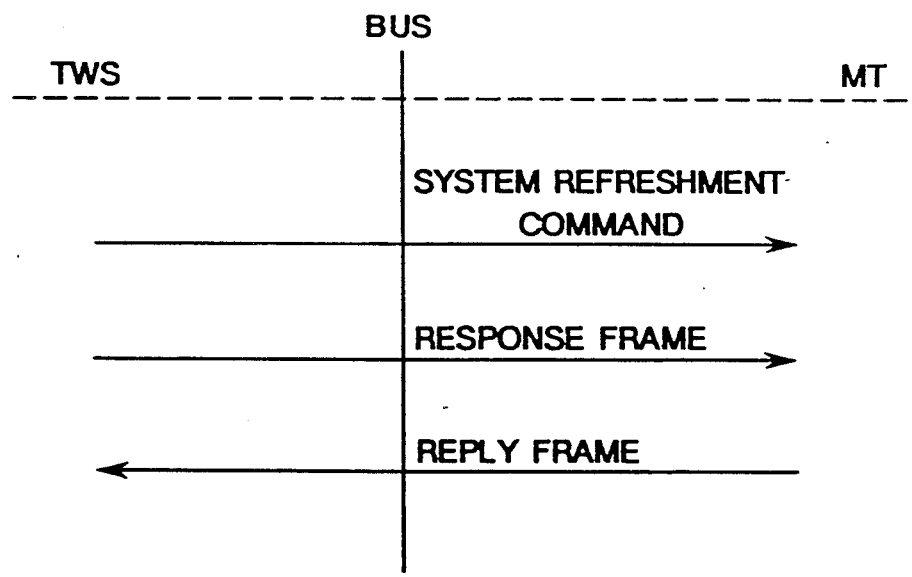
F I G. 14

MULTIPLEX TRANSMISSION SYSTEM FOR USE IN A VEHICLE

BACKGROUND OF THE INVENTION

This invention relates to a multiplex transmission system based on a multiplex transmission system such as a CSMA/CD system applied to signal transmission in a vehicle or, more particularly, to a transmission system using a decentralized type multiplex communication network.

With the development of vehicle electronization, the problem of increase in the amount of wiring (wire harness) for connecting electronic parts becomes stringent. Multiplex communication is noticeable as a means for solving this problem particularly in the field of motor vehicles. A multiplex communication system is based on a serial transmission process in which a plurality of groups of data items are sent in a time-sharing multiplex manner.

In the field of motor vehicles, network forms of this multiplex communication are grouped into a complete multiplex type and a partially multiplex type or into a centralized type and a decentralized type. The partially multiplex type consists of a mixture of non-multiplex sections and multiplex sections. In multiplex sections, switches and loads distanced from each other are connected by multiplex transmission units. It is said that in this type of network the number of wires is increased although the total length of wires is reduced because separate wirings are required for connections between units, switches and loads. In a centralized type network, a plurality of slave transmission units are connected to one master transmission unit. However, it is said that the centralized type enables a reduction in the diameter of wires but is disadvantageous in that breakdown of the master directly results in system down and that the degree of design freedom is low.

On the other hand, the decentralized type is spotlighted though disadvantageous in terms of cost, because it enables a remarkable reduction in the wire diameter, is improved in reliability with respect to partial system down and has high flexibility with respect to design changes. (An example of this type of network is disclosed in Japanese Patent Laid-Open No. 62-4658.) For decentralized multiplex communication systems, a CSMA/CD method is adopted, as proposed in SAE (Society of Automotive Engineers) standardization. In this type of transmission system, a data frame having a destination address is transmitted from one of multiplex nodes, and the destination multiplex node designated by this destination address returns a reception confirmation signal (ACK) after the reception of the frame if it has correctly received the transmitted data from the transmission path. There has also been; by the Assignee of this invention proposed a PALNET (protocol for automobile local area network) system developed from the CSMA/CD system, as described in Japanese Patent Application Nos. 63-273305, 63-273306, and 63-273307. In this system, ACK signals are returned from all active nodes each time of signal reception; if sixteen nodes are connected, sixteen ACK signals are supplied to the transmission path. The destination node is discriminated with an identifier (ID). An ACK table is updated according to consistency/inconsistency between statuses before and after the transmission.

There is a possibility of occurrence of various kinds of transmission errors including errors relating to exchange between actuators, and parity errors. For simplifying a vehicle transmission system by utilizing multiplex communication, it is primarily important to consider the reliability of the system. In this case, the reliability is improved not by complete elimination of errors but accurate detection thereof and restoration from error states. In multiplex communication systems for motor vehicles, there is a possibility of instantaneous (intermittent) malfunctions due to electromagnetic spikes as well as solid (fixed) malfunctions including failures of electrical device elements and signals lines. In fact, instantaneous malfunctions occur more frequently.

According to the proposed Palnet system, if it is determined that a malfunction has occurred during reception or transmission, re-transmission sequence is repeated certain times (e.g., three times). If the number of re-transmission times exceeds the predetermined number, it is determined that the designated node has not existed or the system malfunctions have occurred.

However, there is no definite law which administrates instantaneous malfunctions and the number of times of repetition of the re-transmission sequence. In particular, during use in a motor vehicle, it is difficult to predict how long does an unstable transmission state continue. In other words, if the number of re-transmission times is excessively increased to cope with instantaneous malfunctions, the time taken to detect a solid failure is increased. If the number of re-transmission times is reduced, an instantaneous malfunction may be erroneously discriminated as a node malfunction.

In a motor vehicle control system in which a plurality of multiplex nodes are connected, possible errors are not limited to communication errors. For example, there is a possibility of inconsistency between the states of an input device element such as a switch and an output device element such as a display lamp, owing to a malfunction of the switch. For example, while the switch is turned on, the corresponding lamp is not lighted. It is difficult to detect such an inconsistency as a communication error. It is therefore important to solve the inconsistent state instead of detecting the same.

SUMMARY OF THE INVENTION

The present invention has been achieved under these circumstances, and an object of the present invention is to provide a multiplex vehicle transmission system in which a transmission control process different from the conventional fixed re-transmission sequence for coping with an instantaneous communication failure is conducted to obtain the newest information on the status of nodes connected to the transmission path and to thereby enable immediate system restoration with respect to the node responsible for the failure.

To attain this object, according to the present invention, there is provided a multiplex transmission system for use in a vehicle, comprising:

(a) detection means for detecting transmission errors in the system; and (b) a plurality of multiplex communication nodes mutually connected by a common multiplex transmission path, including:

(b1) a plurality of first communication nodes including a communication control unit for controlling communication between the nodes based on a decentralized multiplex protocol; and (b2) a second communication node including at least a communication control unit for controlling communication through the overall system, the second communication node having:
(b2-1) command means for commanding each of the plurality of first communication nodes to transmit information on the status of the corresponding node to the transmission path, when the detection means detects an error.

In the thus-constructed system, each of the first nodes supplies its newest status information to the transmission path in response to the predetermined command, thereby enabling the correct present system status to be restored without failure. In particular, it is possible to cope with instantaneous malfunctions and solid malfunctions in a suitable manner.

In accordance with a preferred form of the present invention, each of the plurality of first communication nodes comprises: a means for receiving and analyzing status information from the other nodes after receiving the command from the second communication node; and a means for initializing itself according to the results of analysis of the status information.

In accordance with another preferred form of the present invention, an error is recognized when the number of times of re-transmission for restoration from an error on the transmission path exceeds a predetermined number.

In accordance with still another preferred form of the present invention, the first communication nodes include an electrical equipment element, e.g., an input device such as a switch or a sensor, and the status information includes information on the status of this input device.

In accordance with a further preferred form of the present invention, the first communication nodes include a node for electrical equipment elements including an input device such as a switch or a sensor, and another node for electrical equipments including an output device such as an actuator corresponding to the input device.

In accordance with a further preferred form of the present invention, if some of the first communication nodes are nodes for electrical equipment elements each having an input device such as a switch or a sensor while the other of the first communication nodes are nodes for electrical equipments each having an output device such as an actuator corresponding to the input device, each of the other of the first communication nodes initializes its output device according to the information on the status of the input device contained in the received status information.

In accordance with a further referred form of the present invention, the status information is prepared in the form of a frame and is supplied to the transmission path, information on a priority order for mediating a collision of data is attached to the frame, and a high priority order is given to the frame of the status information supplied from the node having the input device element.

Another object of the present invention is to provide a multiplex vehicle transmission system capable of positively solving any inconsistency between the states of nodes.

To attain this object, according to the present invention, there is provided a multiplex vehicle transmission system comprising:

(a) observation means for observing passage of a predetermined period of time; and
(b) a plurality of multiplex communication nodes mutually connected by a common multiplex transmission path, including:
(b1) a plurality of first communication nodes including a communication control unit for controlling communication between the nodes based on a decentralized multiplex protocol; and
(b2) a second communication node including at least a communication control unit for controlling communication through the overall system, the second communication node having:
(b2-1) command means for commanding each of the plurality of first communication nodes to supply information on the status of the corresponding node to the transmission path, when the observation means detects passage of the predetermined period of time.

In this system, it is possible to periodically ascertain the system status with accuracy and, hence, to obtain the newest status information from each node. Even a malfunction in the transmission system owing to an error undetected with a rare possibility can be corrected.

Other objects and advantages besides those discussed above shall be apparent to those skilled in the art from the description of a preferred embodiment of the invention which follows. In the description, reference is made to accompanying drawings, which form a part thereof, and which illustrates an example of the invention. Such an example, however, is not exhaustive of the various embodiments of the invention, and therefore reference is made to claims which follow the description for determining the scope of the invention.

BRIEF DESCRIPTION OF THE DRAWINGS

FIG. 9BA is a flow chart of a control procedure of a refreshment command sending subroutine for the CPU of the node TWS;

FIG. 9BB is a flow chart of a control procedure of a reply frame sending subroutine for the CPU of the node TWS;

FIG. 11 is a diagram showing format example of a log for recording the number of communication errors;

FIG. 13 is a diagram of the principle of determination of a priority order when data collision takes place between frames; and FIG. 14 is a diagram of response of the node MT to "system refreshment" command sent from the node TWS.

DESCRIPTION OF THE PREFERRED EMBODIMENT

An embodiment of the present invention will be described below with reference to the accompanying drawings, in which embodiment the present invention is applied to a multiplex communication apparatus of the above-mentioned PALNET type used in a vehicle.

Figure 1:
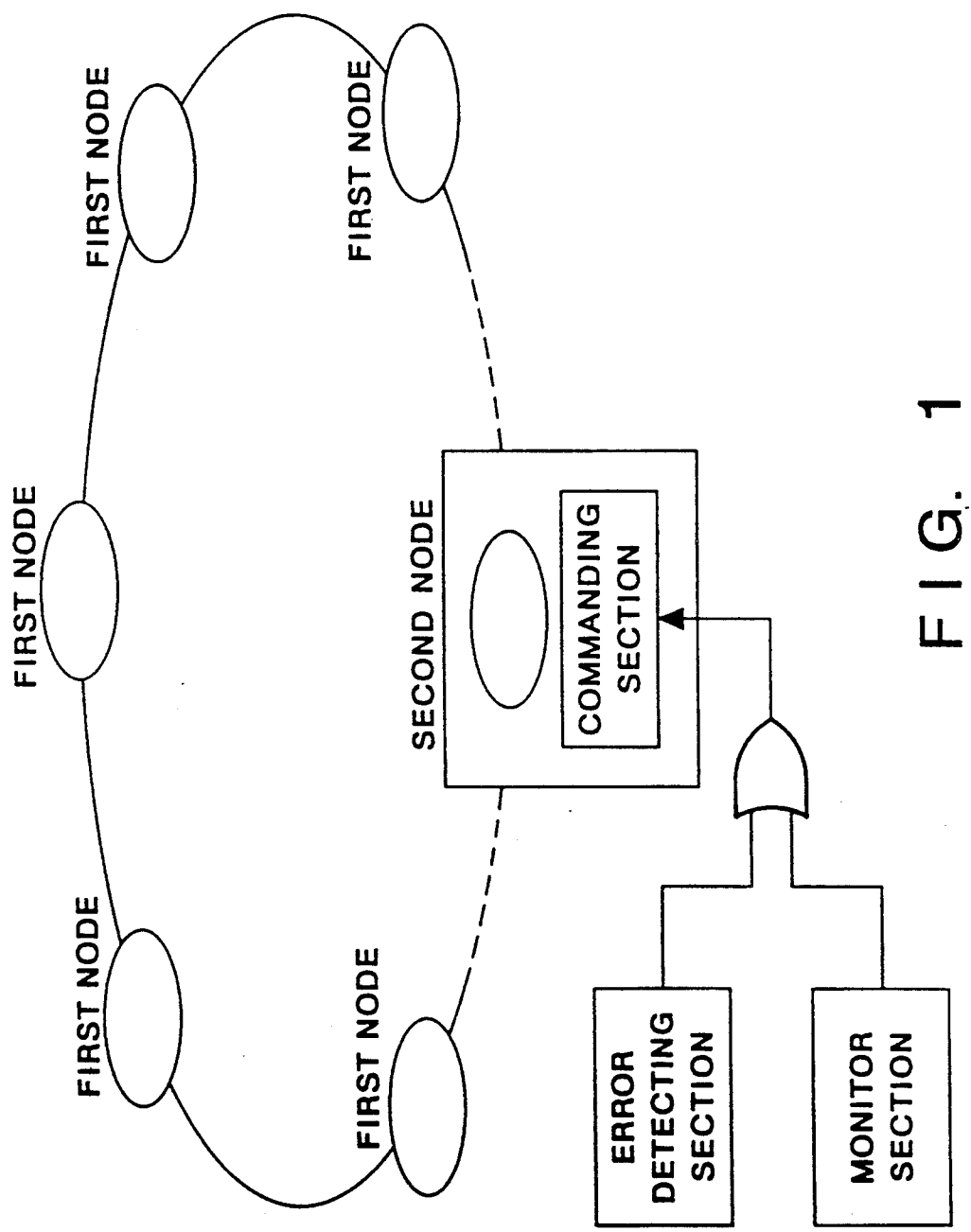
FIG. 1 is a simplified diagram showing the present invention.

FIG. 1 schematically shows the construction of this embodiment system. In this system shown in FIG. 1, five nodes each of which is to be classified as a first communication node and another node which is to be classified as a second communication node are connected to a transmission path. The second node includes an error detection section for detecting errors in the transmission path, a monitor section for observation with respect to time, and a commanding section which issues a system refreshment command described later if a certain error occurs in the transmission path or if passage of a certain period of time is detected by the monitor section.

Figure 2:
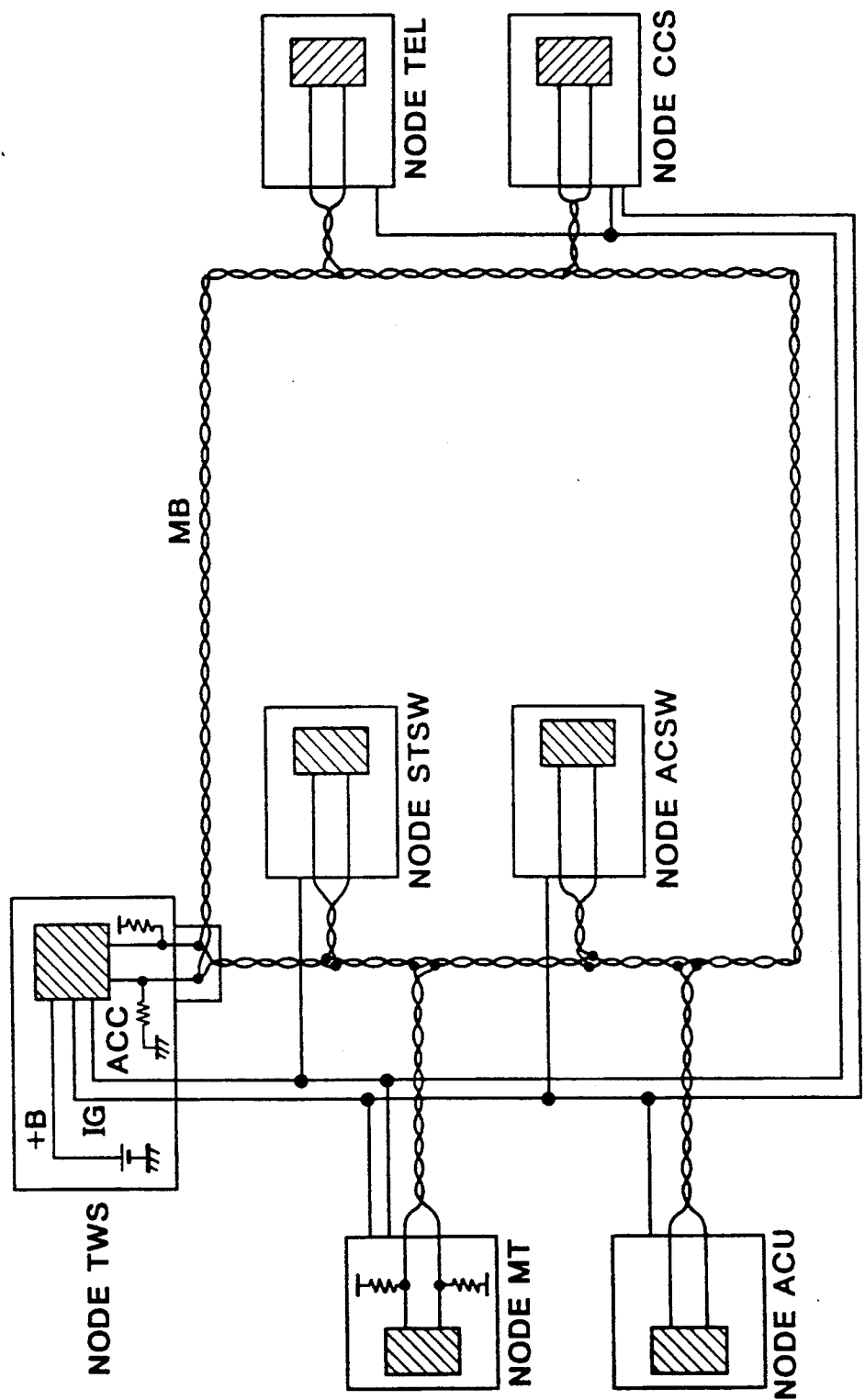
FIG. 2 is a diagram of a network of a multiplex transmission apparatus which represents an embodiment of the present invention.

FIG. 2 shows a more concrete example of the embodiment network system shown in FIG. 1. The present invention will be described below in detail with respect to the system shown in FIG. 2.

FIG. 2 shows the overall connections of nodes used in the embodiment network system. For simplification of the description, the number of nodes used in this embodiment is limited to seven. The nodes are connected by a multiplex transmission path bus MB formed of twisted pair wires or the like. These multiplex nodes include a multiplex node CCS provided for a unit for display control of a navigation apparatus, an audio apparatus and so on, a multiplex node MT for meters, a multiplex node TEL for a mobile telephone adapter, a multiplex node ACU for an air conditioner control unit, a multiplex node ACSW for switches of the air control unit, a multiplex node STSW for switches provided around the steeling wheel shaft, and a node TWS provided in a connection box for supplying power to each node and for connecting a self-diagnosis tester. TWS is an abbreviation of "total wiring system".

The switches provided around the steeling wheel shaft include, for example, a turning-right switch, a turning-left switch, a small lamp switch, a horn switch, and a head lamp high beam switch. The meters include a turning-right indicator, a turning-left indicator and a head lamp high beam indicator.

A door switch for detecting the open/closed state of a door is connected to the node TWS, as will be described below.

Although only seven nodes are shown in FIG. 2 for simplification of the description, additional nodes may actually be provided for connection of other switches and loads. For example, a front-multiplex node and a rear multiplex node may be further provided. The front multiplex node may have a front tuning-right signal lamp, a front turning-left signal lamp, front small lamps, a horn and so on, and the rear multiplex node may have a rear tuning-right signal lamp, a rear turning-left signal lamp, tail lamps and so on. The connection relationship between the nodes and the power supply is not limited to the relationship shown in FIG. 2, and may be selected as desired in consideration of operability, handling and so on.

[Frame Format]

Figure 3:
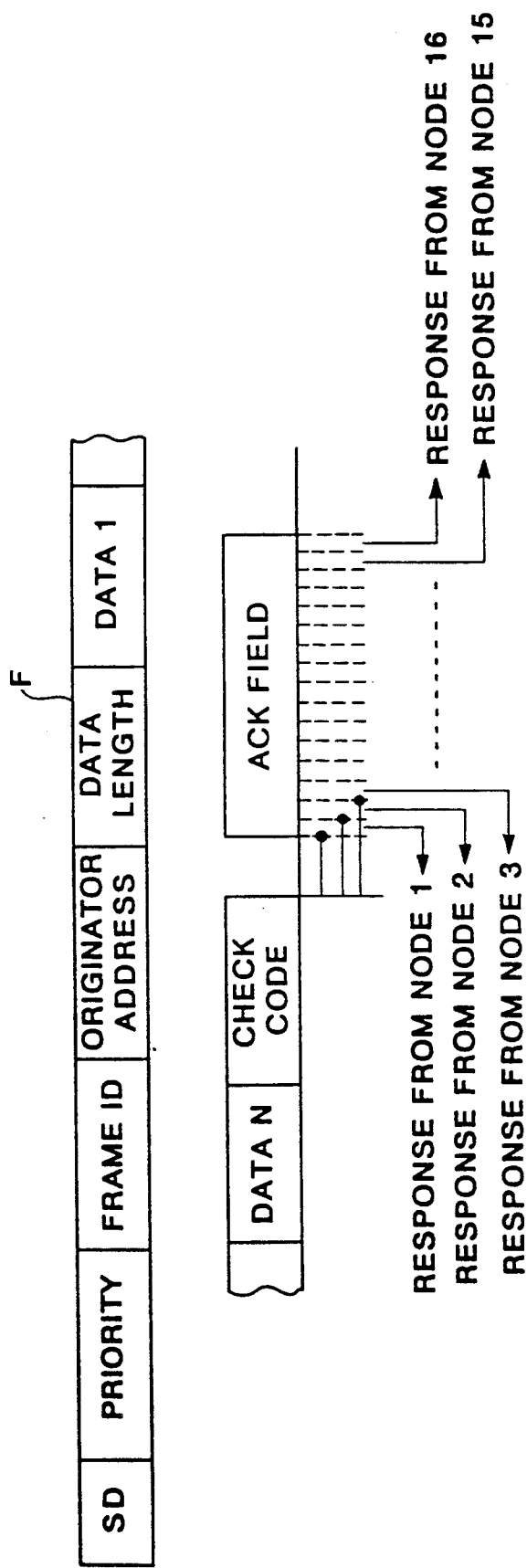
FIG. 3 is a diagram of a frame format used in the embodiment.

In the multiplex vehicle transmission system in accordance with this embodiment, vehicle driving information is transmitted as a sequence of frames F, each having a construction such as that shown in FIG. 3. The vehicle driving information includes a category of information that a switch is turned on for example. Each frame F is constructed to have a SD (start delimiter) code, a priority code, a frame ID code, data length, items of data 1 to N, and a check code.

"SD code" is a specific code for indicating the start of the frame F. The receiving multiplex node recognizes the start of the frame F when it receives the SD code. "Priority code" is a code for designating a priority order in which frame signals representing groups of data items simultaneously transmitted from a plurality of multiplex nodes and collision with each other are processed. If collision of a plurality of groups of data items takes place, one of the data groups having the highest priority is processed first. For example, "priority code" is used to determine one of the nodes from which a reply frame is received with priority, with respect to a later-mentioned system refreshment command issued from the TWS unit. This priority control will be explained later with reference to FIG. 13.

"Frame ID code" is a code for identifying data assigned to bits in respective DATA fields. In other words, it is used to designate the node in which the present frame should be used, which operation corresponds to Functional Addressing described in the document "Proposal for a Vehicle Network Protocol Standard" made public in SAE International Congress and Exposition (February 1986). "Originator address" is a physical address of the node which transmits the present frame F. If physical addresses "1", "2", "3", "4", "5", "6", and "7" are respectively assigned to the seven nodes CCS, MT, TEL, ACU, ACSW, STSW, and TWS of the system shown in FIG. 2, the relationship between the frame ID and the physical numbers is as shown in the following table:

TABLE

| ID | Physical Address | | | | | | |
|---|---|---|---|---|---|---|---|
| | 1 CC | 2 MT | 3 TE | 4 ACU | 5 ACS | 6 ST | 7 TW |
| 0 | O | O | O | O | O | O | O |
| 1 | O | | | | | | |
| 2 | | O | | | | | |
| 3 | | | O | | | | |
| 4 | | | | O | | | |
| 5 | | | | | O | | |

TABLE-continued

| ID | Physical Address | | | | | | |
|---|---|---|---|---|---|---|---|
| | 1<br>CC | 2<br>MT | 3<br>TE | 4<br>ACU | 5<br>ACS | 6<br>ST | 7<br>TW |
| 6 | | | | | | O | |
| 7 | | | | | | | O |
| 8 | O | | | | | | O |
| 9 | | O | | | | | O |
| 10 | | O | | O | | | O |
| .. | | | | | | | |

According to this table, a frame is sent to all the nodes if the corresponding ID is "0". For example, in a case where an "air control on" switch controlled by the node ACSW is turned on, and where it is necessary to light a display lamp "air control on" controlled by the node MT and to turn on the blower motor of the air conditioner controlled by the node ACU, it is necessary for a frame containing information that the "air control on" switch has been turned on to be sent to the nodes MT, ACU and TWS. The ID of the frame for the case is "10" according to the above table. Needless to say, the contents of the above table are only examples and the above relationship can be set in any other way.

In the section "data length" shown in FIG. 3, the number of subsequent data items are written. If there are N data items, N is transmitted as data length. The node which has received this frame reads the data length content for these data items and confirms this by reading the check code CRC (error detection code) subsequent to these data items to recognize the end of the frame.

A reception confirmation signal field (ACK field) shown in FIG. 3 will be described below. This field consists of a plurality of bits, e.g., 16 bits, and bits in advance determined for the respective multiplex nodes are provided in this field. Each node effects normal reception confirmation by using the corresponding bit of the ACK field. That is, the transmitting node sets only one of the bits of the ACK field at the position corresponding to itself to "0" while setting all the other bits to "1", i.e., setting one "0" bit and 15 "1" bits, and supplies these bits to the transmission path subsequently to the transmitted frame while setting a predetermined gap between the transmitted frame and the ACK field. Each of the receiving multiplex nodes checks whether or not there is any error in the content of the received frame by using the check code, and, if there is no error, returns to the originator node a reception confirmation signal (ACK signal) based on setting "0" in the corresponding one of the bit regions whose positions are in advance determined for the respective multiplex nodes. That is, it is recognized that the node which transmits ACK field in which the corresponding bit is "0" has received the frame normally.

[Hardware Construction of Node]

Figure 4:
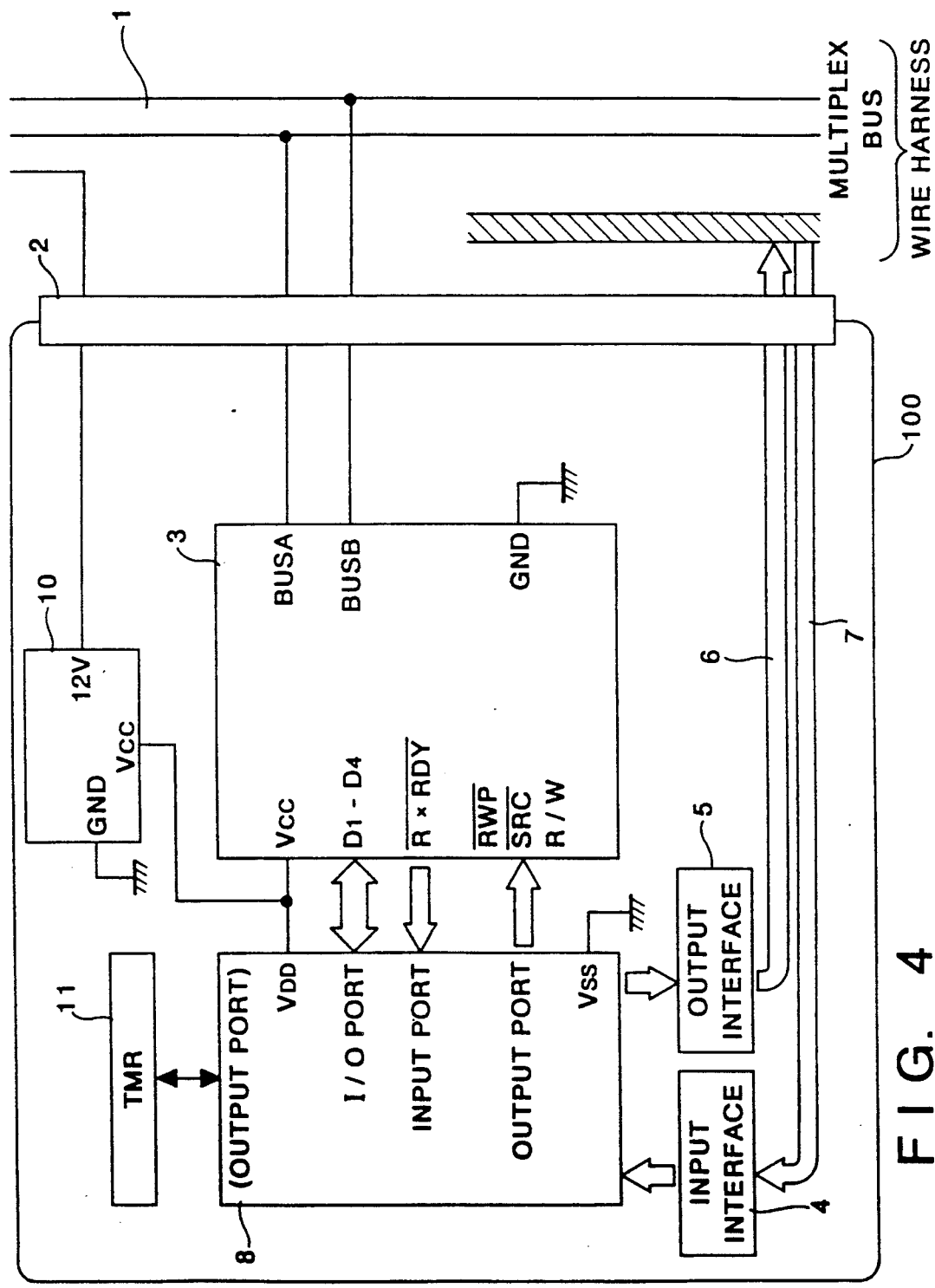
FIG. 4 is a diagram of the hardware construction of nodes used in the embodiment.

FIG. 4 schematically shows the construction of a multiplex communication controller used in common for each of the nodes shown in FIG. 2.

The multiplex communication controller 100 shown in FIG. 4 is connected to a main bus (MB) 1 corresponding to the transmission path MB shown in FIG. 2 through a connector 2. The controller 100 has a multiplex interface module 3, and a host CPU 8. The multiplex interface module 3 detects carrier/collision on the MB 1 and reads serial data from the MB 1 to convert into parallel data ($D_7$ to $D_0$). The interface module 3 sends the read 8 bit parallel data ($D_7$ to $D_0$) to the the host CPU 8, and converts parallel data supplied from the CPU 8 into serial data. The interface module 3 also calculates the error detection code and effects other operations. That is, the interface module 3 effects a control at the physical level. The host CPU 8, switches actually used, loads (not shown) and so on are connected through wires 6 and 7, an input interface circuit 4 and an output interface circuit 5. The multiplex communication controller 100 also has a power supply circuit 10 which includes a DC-DC converter for producing Vcc from a 12 V battery voltage.

The hardware of the multiplex communication LSI module 3 includes a controller (not shown) for effecting transmission control based on a PALNET system developed from the CSMA/CD system, a decoder/encoder (not shown) for effecting logical level signal conversion of data on the MB 1, a transceiver (not shown) directly connected to the MB 1 and serving as a level changer, and a DMA (not shown) for access to a memory of the CPU 8.

[Network Control]

Figure 5A:
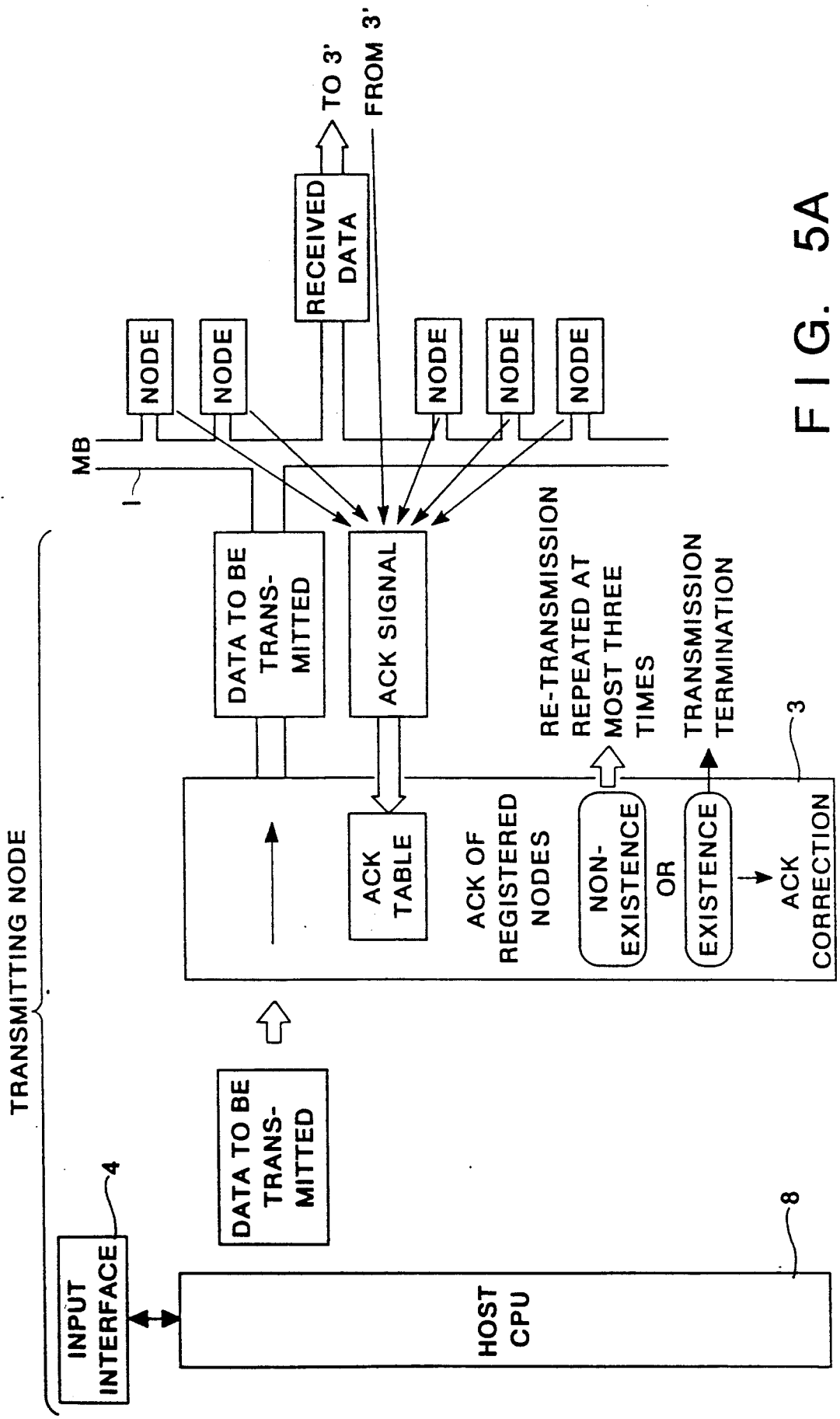
FIGS. 5A and 5B are diagrams showing a flow of data sent from a transmitting node to a receiving node.
Figure 5B:
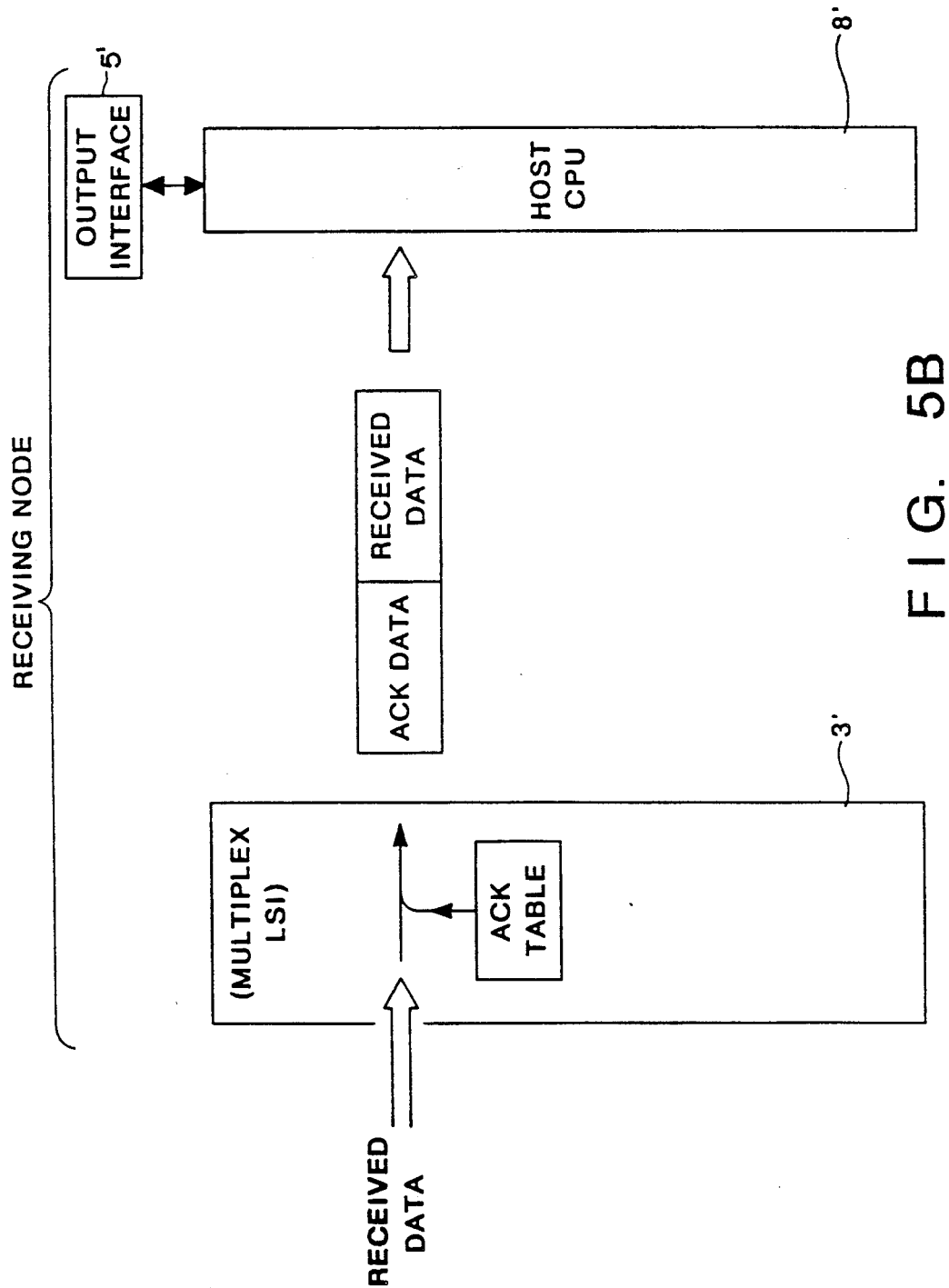

FIGS. 5A and 5B schematically show a sequence of frame transmission/reception conducted between the nodes. As mentioned above, the communication control at the physical level including frame sending control and error detection is effected by the multiplex communication LSI 3, while frame data processing, error retransmission and so on are effected by the host CPU. Error processing and frame transmission/reception effected between the nodes will be described below with reference to FIGS. 5A and 5B.

Error Processing

As mentioned above, the multiplex communication LSI effects ACK replying, detects CRC errors, and informs the CPU 8 that an error has been detected. The kinds of error about which the CPU 8 is to be informed are "multiplex bus errors" and "node malfunction". The following four kinds of error (ER's 1 to 4) are included in multiplex bus errors, and information on such errors is sent as status information from the multiplex communication LSI 3 to the CPU 8 through data lines $D_7$ to $D_0$ when the CPU 8 activates a status read terminal (SRC).

ER 1: bit error CRE.

This error is detected as an abnormal format on the transmission path.

ER 2: CRC error CRE.

Errors BIE and CRE are errors in reception.

ER 3: channel error CHE.

This error is detected as a passive state when the multiplex bus 1 is occupied.

ER 4: CS error CSE.

This error is detected as the "0" state of a bit TXRDY while a passive state continued for 0.1 ms or more is not found during a period of time of 6.2 ms.

A node malfunction is such that the ACK is "1" (which indicates nonexistence) while the existence of the corresponding node is marked in "node registration data" controlled by the multiplex module. In this event, the CPU or the multiplex module of the corresponding node may be malfunctioning or a branch of the bus 1 is open. Information on such a node malfunction is sent as predetermined data (ACK data shown in FIGS. 5A and 5B) from the multiplex communication LSI module to the CPU 8.

The registration of the ACK relating to the sequence shown in FIGS. 5A and 5B does not directly relate to the present invention, but it is described in U.S.S.N. 426,399.

Frame Transmission/Reception

If the transmitting node is the node ACSW, the host CPU 8 of the node ACSW, which is informed through the input interface circuit 4 that the air conditioner switch has been turned on, prepares a frame, such as that shown in FIG. 3, which is to be transmitted to the multiplex communication controller of the ACU (air conditioner control unit). The host CPU 8 supplies this frame to the transmission path MB 1 through the multiplex interface module 3. The multiplex interface module 3' of the ACU multiplex communication controller receiving the frame data through the transmission path MB 1 analyzes the received frame data, and drives a compressor or the like of the air conditioner through the output interface circuit 5'.

Processing based on the sequence of FIGS. 5A and 5B will be described below with respect to a case where an error occurs when the frame is transmitted from the node ACSW to the node ACU. In the PALNET system, the transmission destination node is identified with the frame ID, as mentioned above. Since the frame is sent through the MB 1, not only the node identified with the frame ID but the other nodes return the ACK to the originator node provided that the other nodes receive the frame without any error. This ACK signal from each node corresponds to 16 bits of the ACK field shown in FIG. 4, as mentioned above.

The algorism of re-transmission in frame transmission is as described below. The number of re-transmission times is at most three. If one of the nodes returns the ACK at least one time during three times re-transmission, it is recognized that the frame has been normally transmitted to this node. In this embodiment, 16 bits are provided in the ACK field in consideration of future extension, but there are at most seven active nodes as can be understood from FIG. 2. Accordingly, if there is no ACK bit in the ACK field, it is necessary for the transmitting node to discriminate whether the ACK bit absence is due to an error or to the absence of the nodes.

[Interface]

Figure 6A:
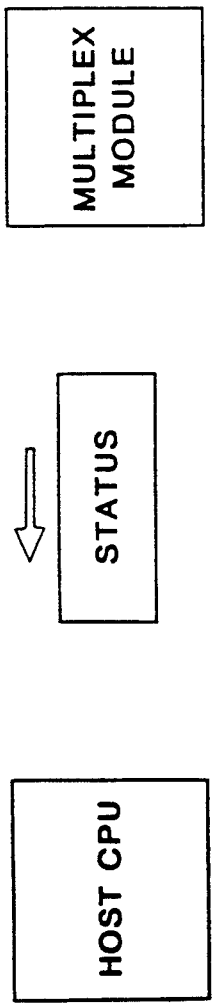
FIGS. 6A through 6C are diagrams of the formats of data exchanged between a host CPU and a multiplex LSI module of each node.
Figure 6B:
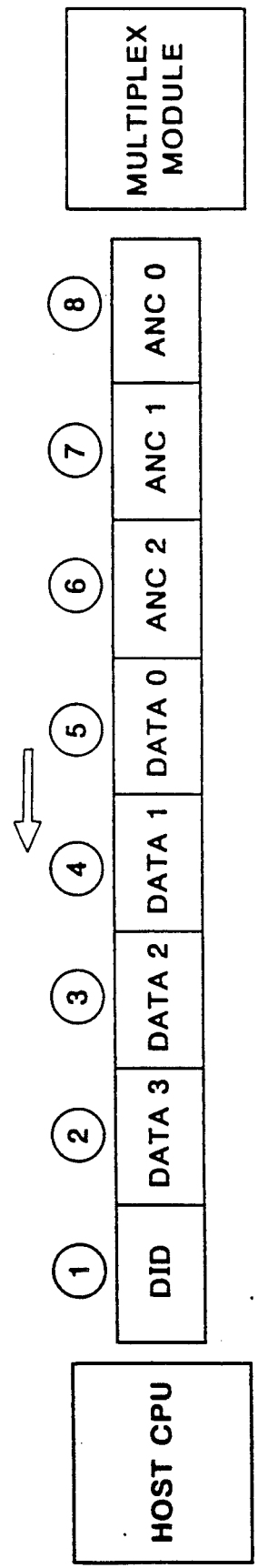
Figure 6C:
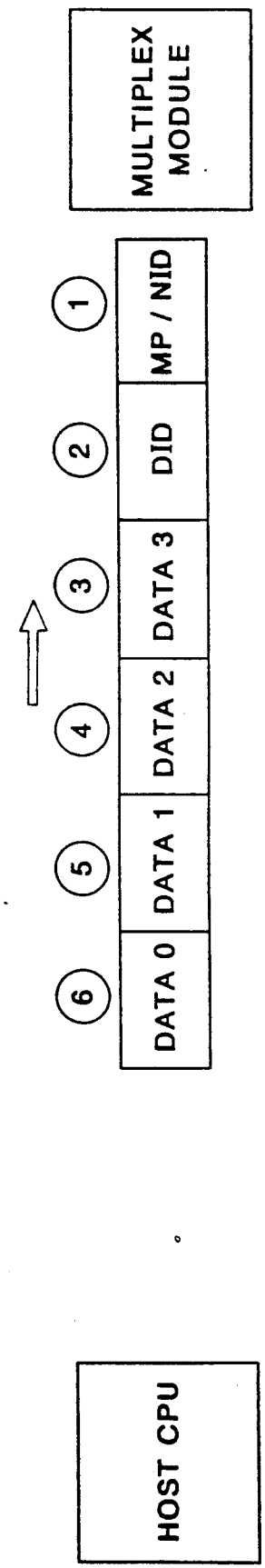

FIGS. 6A through 6C are diagrams relating to the interface between the host CPU 8 of a node and the multiplex communication LSI 3. FIG. 6A shows a format for transmission of status information from the LSI 3 to the CPU 8; FIG. 6B shows a format for transmission of data received by the LSI 3 to the CPU 8; and FIG. 6C shows a format of data which is to be transmitted from the host CPU 8 to the LSI 3 when the frame is transmitted to other frames.

Data ANC shown in FIG. 6B represents information on the ACK field received by the LSI 3. Data DID shown in FIG. 6C corresponds to the frame ID shown in FIG. 3. Data MP/ID corresponds to the priority code of FIG. 3. Conversion between the data formats shown in FIGS. 6B and 6C and the frame format of FIG. 3 is effected by the LSI 3.

[Functions of the Embodiment System]

Some of the functions of this embodiment relating to the essentials of the present invention will be schematically described below. They are the following functions F1 to F6.

F1: If the above-mentioned "multiplex bus error" or "node error" is continuously detected three times or more, the TWS unit sends a "system refreshment" command to all the nodes through the bus.

F2: The node TWS periodically sends a "system refreshment" command to all the nodes at intervals of 5 seconds.

F3: Each of the nodes returns information on its status as a "reply frame" in response to the "system refreshment" command. This status corresponds to the status of input or output device elements controlled by the CPU of the node. If these device elements are input device elements, they are, for example, sensors or switches. If they are output device elements, they are, for example, display lamps, segment LED display elements, solenoids or buzzers.

F4 The frame ID (functional address) of a reply frame is determined based on the table shown above according to the node in which the corresponding data is used.

F5: The host CPU which has received this reply frame changes, in accordance with the data in the frame, the states of the output device elements that it controls. This is a "system refreshment" operation.

F6: With respect to the "reply frame", the priority order of the nodes is previously determined. To determine this priority order, each node sets a predetermined value in the "priority field" shown in FIG. 3.

The "system refreshment" command is also sent out when the engine key switch is turned on to start the system, as well as when the engine key is further turned after starting the system. The former command is necessary because the power is supplied to each node when the engine key switch is turned on. The latter is necessary because, as is apparent from FIG. 2, the number of active nodes is changed according to the position of the engine key.

[System Refreshment]

The "system refreshment" operation based on the function F5 will be described below in more detail with reference to FIG. 7.

Figure 7:
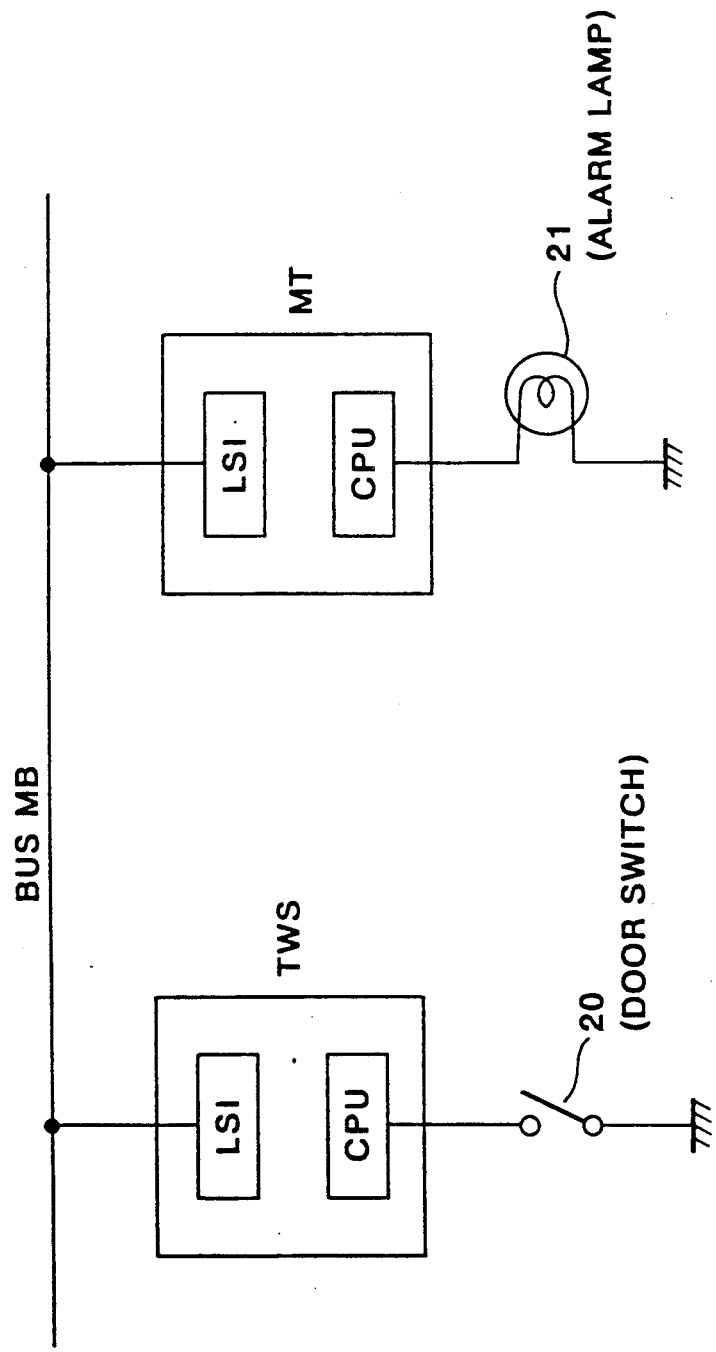
FIG. 7 is a diagram of the functional relationship between a node TWS and a node MT.

As mentioned above, the node TWS has the network control function and also has the functions of the ordinary nodes including that of observing door switches, as shown in FIG. 7. For example, the operation of a door switch 20 for detecting the open/closed states of a door is observed by the node TWS (when the door is open, the switch is open), and a lamp 21 for warning that the door is open is controlled by the node MT. It is assumed here that the switch 20 detects the open state of the door but a frame containing information on this state is not sent from the node TWS to the node MT owing to a communication problem (the above-mentioned error). In this state, the lamp 21 is not lighted although the switch 20 is open; the driver is not warned.

The communication error is detected by the function F1, and the "system refreshment" command is sent from the node TWS to all the nodes, or the "system refreshment" command is automatically sent from the node TWS to all the nodes at intervals of 5 seconds by the function F2. Since the node TWS functions as the ordinary node, it sends a frame data indicating the opened state of the door switch to the node MT when informed of this "system refreshment" state. In this frame data, the bit corresponding to the switch 20 is "1". On the other hand, the MT node knows the bit construction of the frame data, i.e., the one-to-one correspondence between the bits and the switch status, and the CPU of the MT node lights the lamp 21 because the bit corresponding to the switch 20 is "1".

The inconsistency between the state of the sensor or switch serving as an input device element and the state of the display lamp, segment LED display device element, solenoid or buzzer serving as an output device element is thereby dissolved.

The reason for establishing the coincidence between the state of the output device element and the state of the input element described in connection with FIG. 7 is that the operation of this embodiment is based on the premise that an output exists only when an input exists. Accordingly, it is necessary to give priority to the reply frame from the node which controls the input device element. For this reason, the priority order of the nodes described with respect to the function F6 is used.

[Control Procedure]

Figure 8:
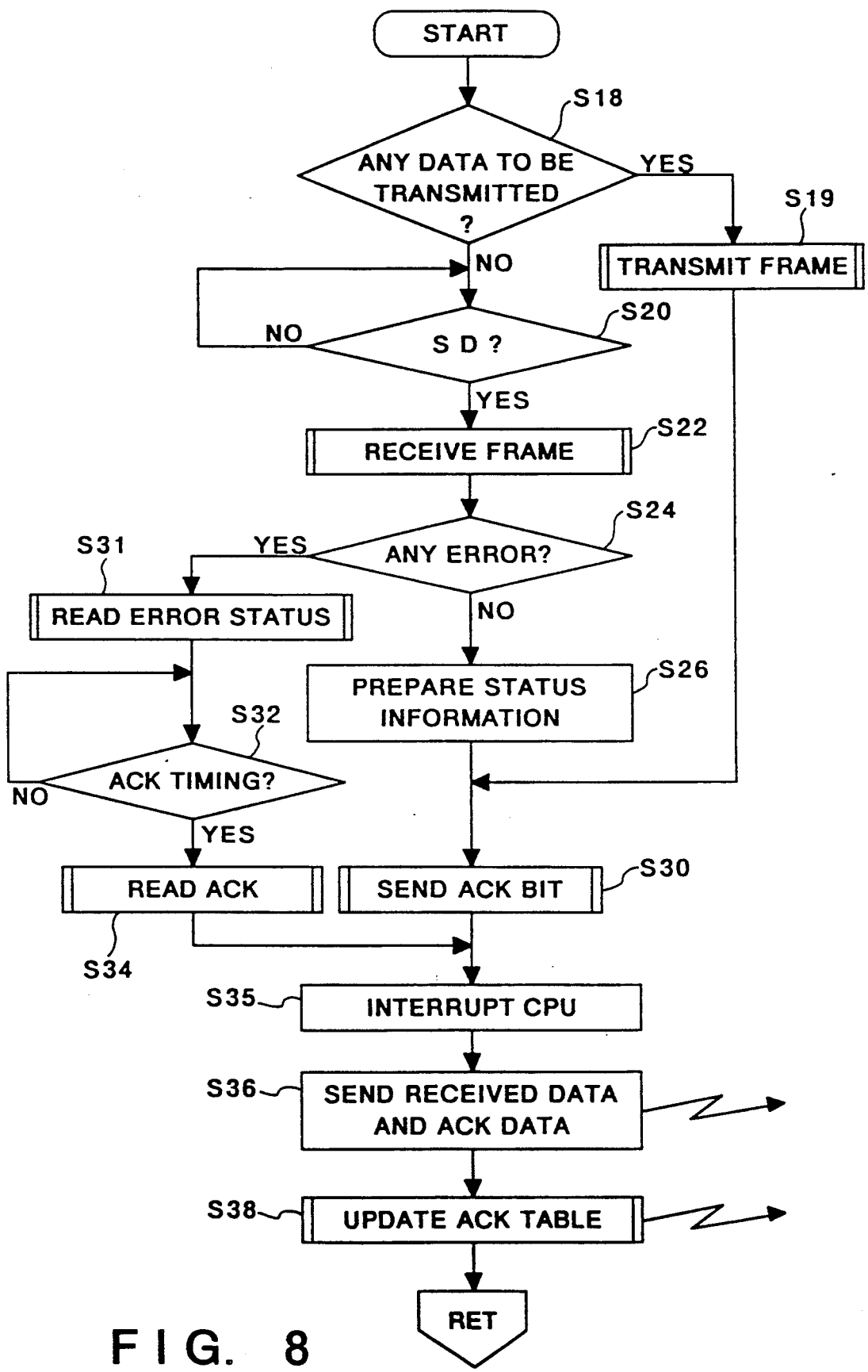
FIG. 8 is a flow chart of a control procedure of the LSI module of the node TWS.

The control procedure of "system refreshment" in the above-described system will be described below with reference to FIGS. 8 through 10. FIG. 8 shows a control procedure for the LSI module of the node TWS, FIGS. 9A through 9D show a control procedure for the host CPU of the node TWS, and FIGS. 10A through 10C show a control procedure for the host CPU of the node MT. The reason for selecting the node TWS for the description of the control procedure is that the node TWS is the subject that supplies "system refreshment" command to the bus 1. All the nodes shown in FIG. 2 including the node TWS are to perform "system refreshment" operations by receiving the "system refreshment" command. In this sense, the control procedure for the respective "system refreshment" operations of the nodes other than the node TWS as shown in FIG. 2 are the same. The control procedure for the "system refreshment" operation of the node other than the node TWS will be represented by the control procedure of the node MT. As mentioned above, the node TWS has the function of observing the door switch. In this sense, the node TWS is identical to each of the other ordinary nodes except that it controls the results of communication for the whole system. For this reason, the operation of the nodes TWS and MT will be described with reference to FIGS. 8 through 10 for representation of the generation of "system refreshment" command and the "system refreshment" operation in this system. The control of the nodes TWS and MT shown in FIGS. 8 through 10 will be first summarized below. The node TWS controls the results of communication for the whole system, and sends a frame having "system refreshment" command into the network according to the results. It also sends out "system refreshment" command at intervals of 5 seconds.

The node TWS sends a "reply frame" into the network after producing "system refreshment" command, and the node MT also sends a "reply frame" into the network after receiving "system refreshment" command. That is, the node TWS sends the reply node to the node MT. Also, the node MT delivers the reply frame to the other ordinary nodes or the node TWS.

Each of the nodes TWS and MT corrects the states of its output device elements based on the received reply frame.

Multiplex Communication LSI of Node TWS

First, a control procedure for the multiplex communication LSI module of the node TWS will be described below with reference to FIG. 8 with respect to the part relating to this embodiment.

In step S18, examination is made as to whether or not data to be transmitted to the bus 1 has been received from the CPU 8. If no data is to be transmitted, the control proceeds to step S20 to wait for the presence of SD code from the nodes other than the node TWS on the bus MB. If SD code is detected, the corresponding frame is detected in step S22 (ACK bits are received in step S34). If at the time of this frame reception and in step S24 there is determined to be no error (CRC error, collision), status information indicating that there is no error while the data is supplied is prepared in step S26. In step S30, ACK is supplied to the MB 1 by the ACK timing of the node TWS (refer to FIG. 4). When the ACK bit for the node TWS is thereby sent out, the LSI of the node TWS is set in the reception mode as well as in the transmission mode to receive ACK bits from the other nodes along with the ACK bit sent from itself. In step S34, ACK bits from the other nodes are thereby received. Irrespective of whether the destination of the frame is the node TWS, the node TWS sends out the ACK bit (as in the case of the other nodes) provided that it receives the frame normally. The control then proceeds to step S35.

If it is determined in step S24 that an error has been detected during frame reception, the control proceeds to step S31 to prepare status information that an error has occurred. In step S32, the ACK timing for the node TWS is waited. In step S34, the ACK bit is transmitted to the MB 1, and the control proceeds to step S35.

Thus, the LSI has status information on the existence or non-existence of any error in communication, and information on the data and ACK used when there is no error.

In step S35, the frame reception is interrupted in the CPU 8 of the node TWS. In step S36, the status data, the transmitted data and the ACK data are sent to the CPU 8 through the buses $D_7$ to $D_0$ (refer to FIG. 6). The control then proceeds to step S30. If the destination of the frame is not the node TWS, the control proceeds to step S38 for control of the ACK table controlled by the LSI of the node TWS (each node has the same ACK table).

If it is determined in step S18 that there is frame data to be transmitted from the node TWS to some of the other nodes, the control proceeds to step S19 to send out this frame. After this frame has been transmitted, the LSI is set in the reception mode to receive ACK bits from the other nodes while being set in the transmission mode to send the ACK bit for the node to which it belongs. In the case of frame transmission also, the received ACK pattern is sent to the CPU 8 as in the case of frame reception. If collision with frames transmitted from some of the other nodes is detected at the time of frame transmission in step S19, the delay time till the re-transmission effected by this node is determined in consideration of the priority order. The determination of this delay time is based on the CSMA/CD method.

Transmission of ordinary frame data will be described below.

Transmission of Ordinary Frame from Node TWS

Figure 9A:
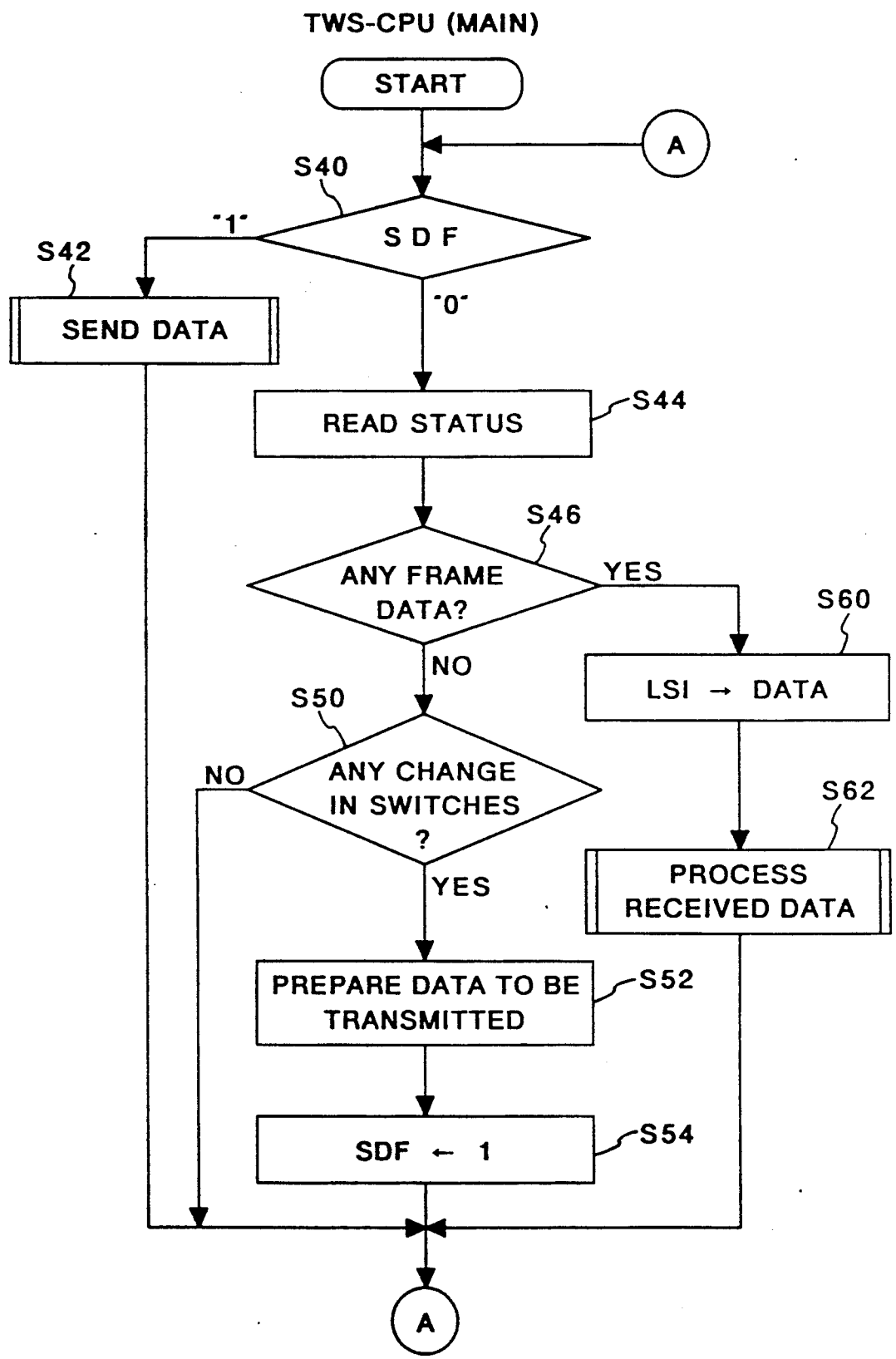
FIG. 9A is a flow chart of a control procedure of a main routine for the CPU of the node TWS.

The flow chart shown in FIG. 9A represents a main routine of the CPU of the node TWS. In step S40, a transmitted data flag SDF is used to examine whether or not the CPU of the node TWS has data which is to be transmitted to the LSI of this CPU. If transmitted data flag SDF is zero, the status of the TWS-LSI is examined in step S44, and examination is made in step S46 as to whether or not this LSI has frame data received from some of the other nodes. If there is no received data, the control proceeds to step S50 to examine whether or not there is any change in the states of the switches observed by the node TWS (including the door switch 20 shown in FIG. 7). If there is a change in the switches, the control returns to step S40. That is, if there is no change in input device elements such as switches, each ordinary node transmits no frame to the bus MB. If there is a change in the switches, data to be transmitted including data representing the states of the switches is prepared in step S52. In step S54, transmitted data flag SDF is set to "1".

This setting of the flag to "1" is detected in step S40 and step S42 is then executed. In step S42, data is sent from the CPU to the LSI. Details of this data sending are shown in FIG. 9B.

If it is determined in step S46 that the LSI has received frame, this data is read in step S60. This reading is as shown in FIG. 6B. In step S62, the received data is processed. Details of this data processing are shown in FIG. 9C.

It is assumed here that the door switch 20 of the node TWS has been changed. Data for informing the node MT of this change is prepared in step S52 (FIG. 9A). Then, a process of sending the data from the CPU of the node TWS to the LSI of the same node will be described below with reference to FIG. 9B. This control procedure includes sending of the data to the LSI and observation of whether or not the data has been correctly sent to the destination node.

Figure 9B:
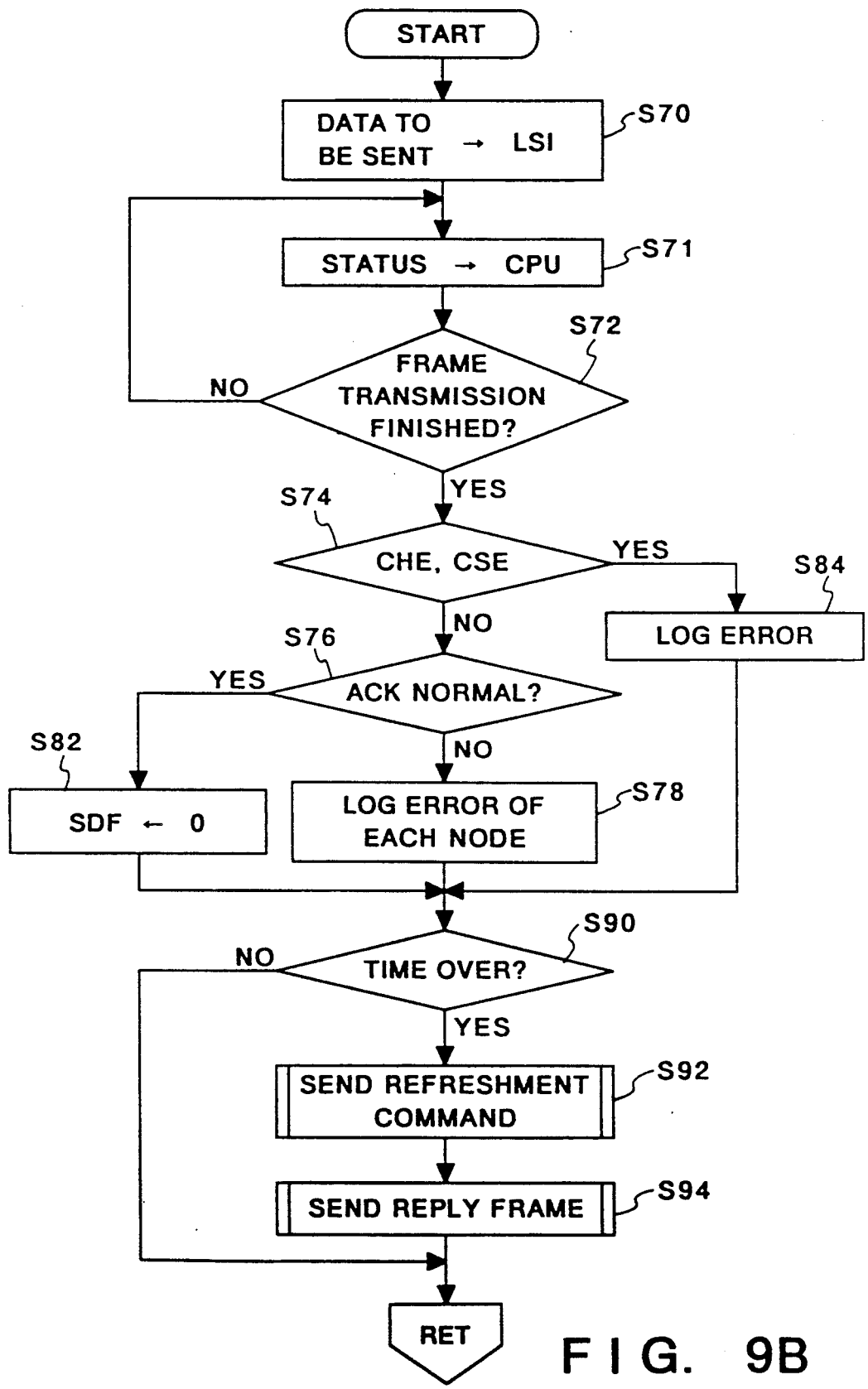
FIG. 9B is a flow chart of a control procedure of a data sending subroutine for the CPU of the node TWS.
Figure 9B:
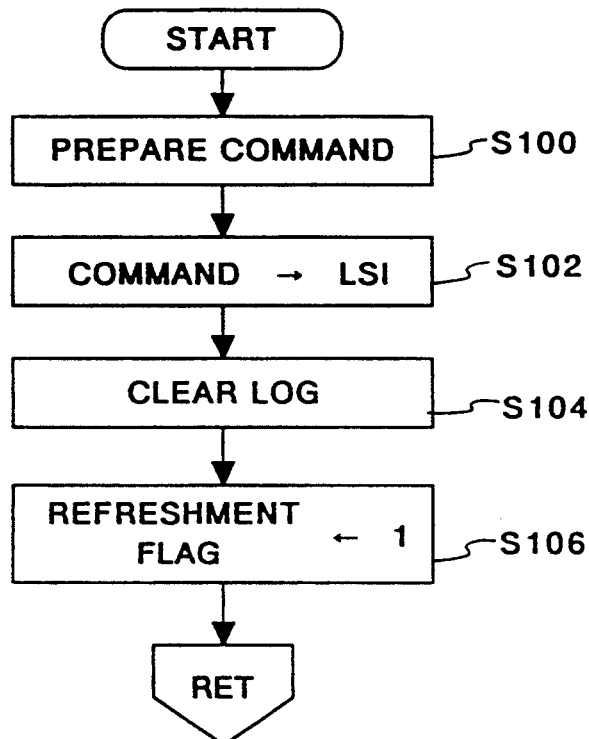
Figure 9B:
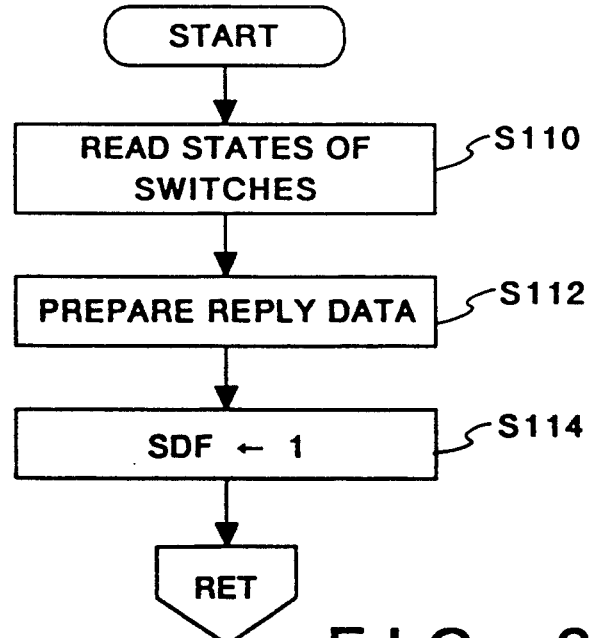
Figure 9C:
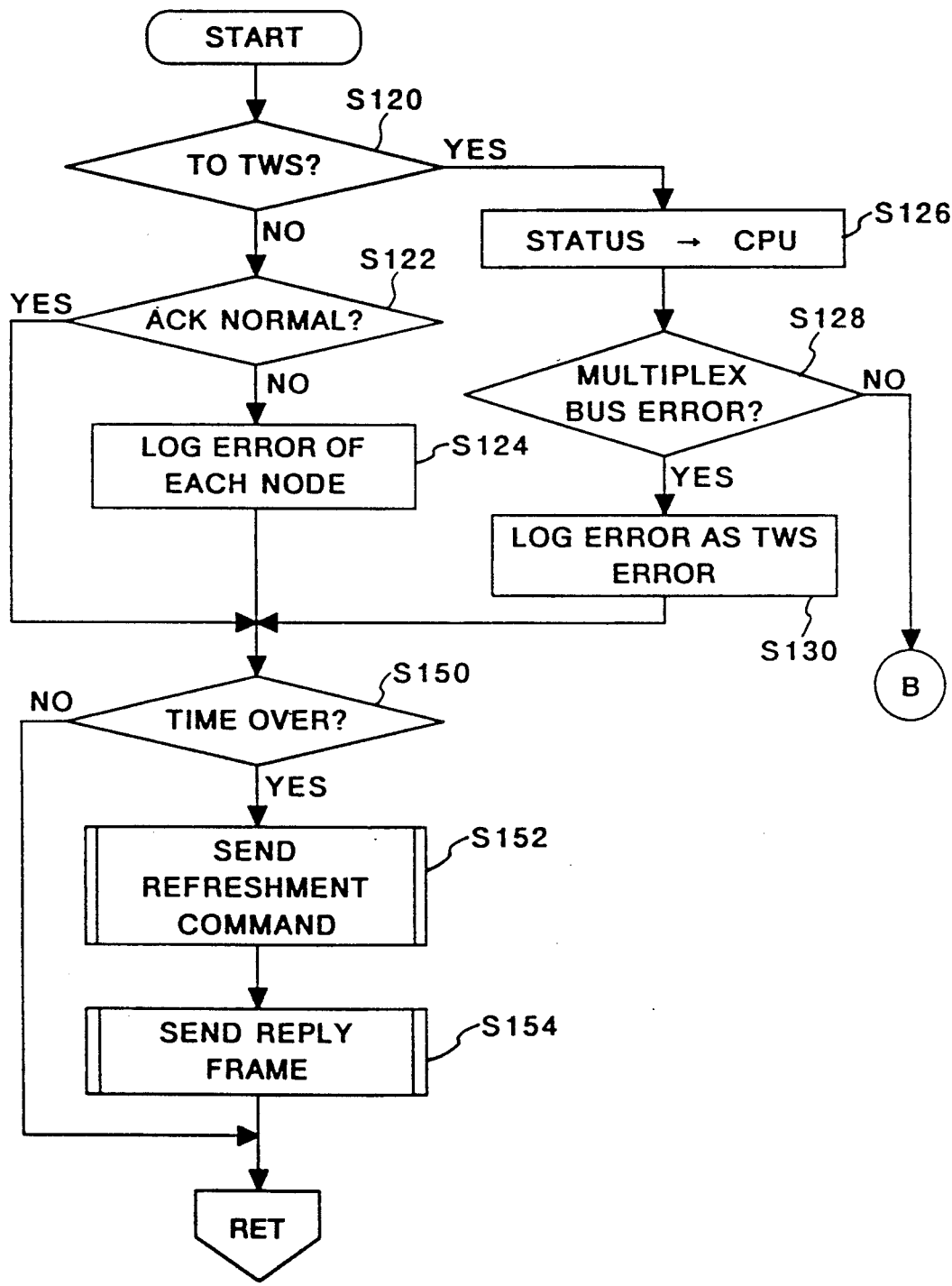
FIGS. 9CA and 9CB are flowcharts of a control procedure of a received data processing subroutine for the CPU of the node TWS.
Figure 9C:
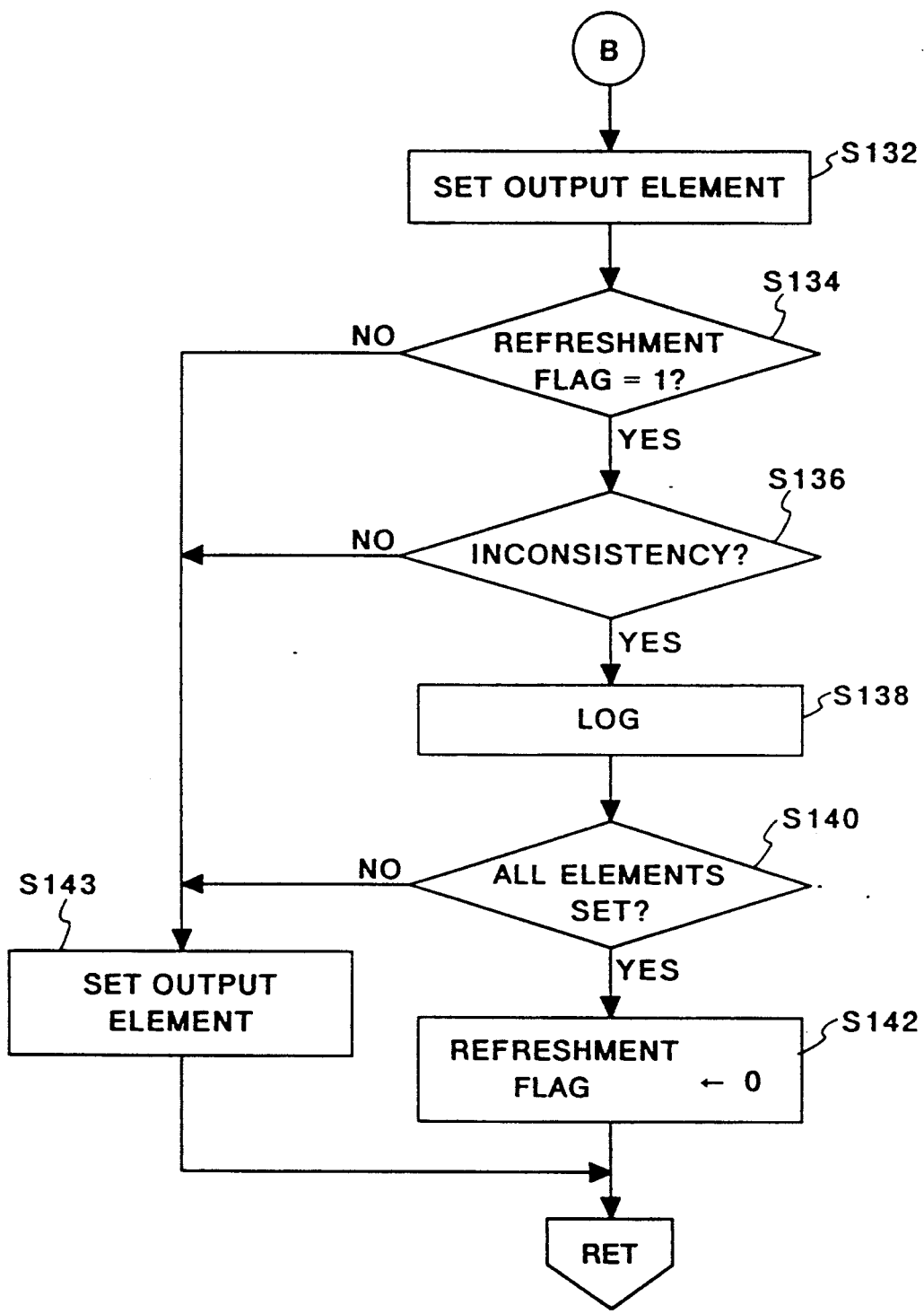

In step S70 of the flow shown in FIG. 9B, this data is sent to the LSI. The data format used at this time is as shown in FIG. 6C. In step S72, based on LSI status information read in step S71, determination is made as to whether or not the frame transmission through the bus MB 1 has been completed.

In step S74, examination is made as to whether or not any multiplex bus error has occurred during the frame transmission. If an error has occurred, this error is counted and logged as an error in the node TWS in step S84 (refer to FIG. 11). That is, an error detected by the node TWS during the transmission from the same node must be identified as an error in the operation of the node TWS irrespective of the kind of cause. If no multiplex bus error has occurred, examination is made in step 76 as to whether or not there is an ACK error. If there are some ACK errors, the errors are counted in step S78 with respect to the nodes which have not returned the normal ACK (refer to FIG. 11). The nodes can be discriminated by examining the ACK bits.

If neither multiplex bus error nor ACK error are found, the control proceeds to step S82 to reset transmitted data flag SDF. If at least one multiplex bus error or ACK error is found, the flag is not reset and the data which has not been successfully transmitted is sent to the LSI module to be transmitted to the network again.

An error log such as that shown in FIG. 11 is used to count errors of each node with messages. That is, message numbers are attached to the data items in the frame, and the same message numbers are attached to re-transmitted messages. It is therefore possible for the CPU of the node TWS to discriminate whether the present data is data of a received re-transmitted frame or data of a new frame.

In step S90, based or the log shown in FIG. 11, examination is made as to whether or not the limit of the number of re-transmission times is exceeded with respect to each of the nodes. For example, in this embodiment, the upper limit of the number of re-transmission times is set to three times.

Thus, the ordinary frame is supplied to the bus MB to be transmitted from the node TWS to the node MT.

Reception of Ordinary Frame in Node MT

Figure 10A:
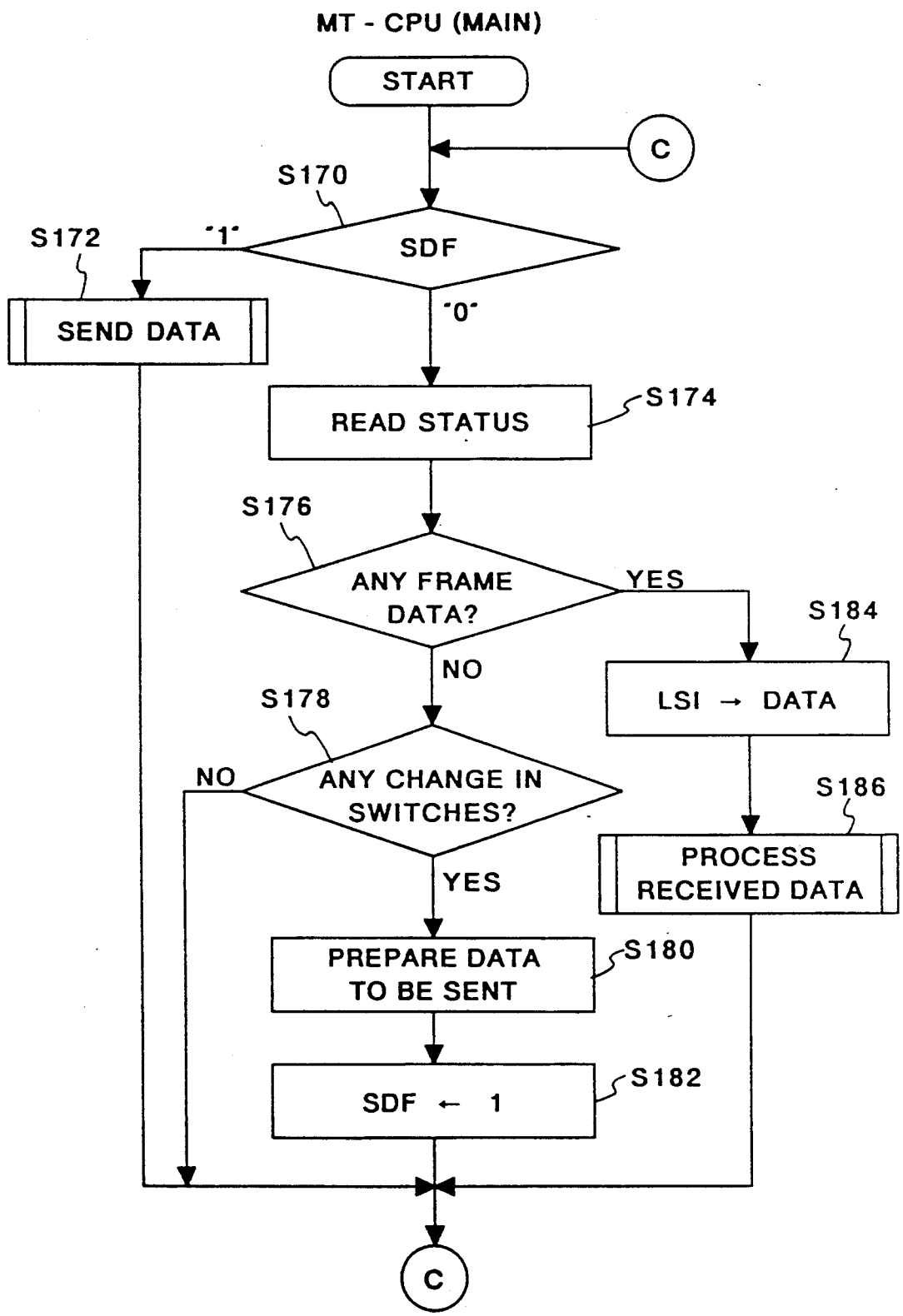
FIG. 10A is a flow chart of a control procedure of a main routine of the CPU of the node MT.

FIG. 10A is a flow chart of a main control procedure for the host CPU of the node MT (the same procedure is used for the other nodes except for the node TWS). The control procedure for the LSI module of the node MT is substantially the same as that shown in FIG. 9B and therefore will not be described.

Figure 9D:
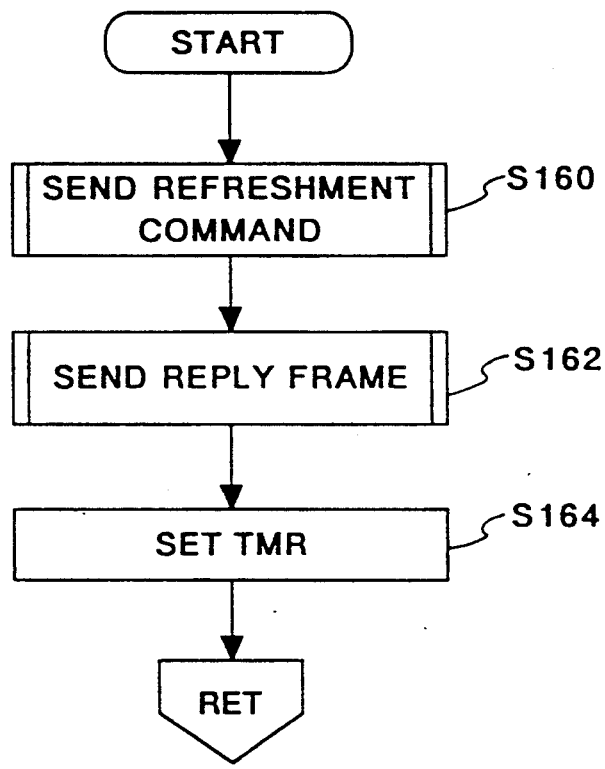
FIG. 9D is a flow chart of a control procedure of timer interrupt in the CPU of the node TWS.
Figure 10B:
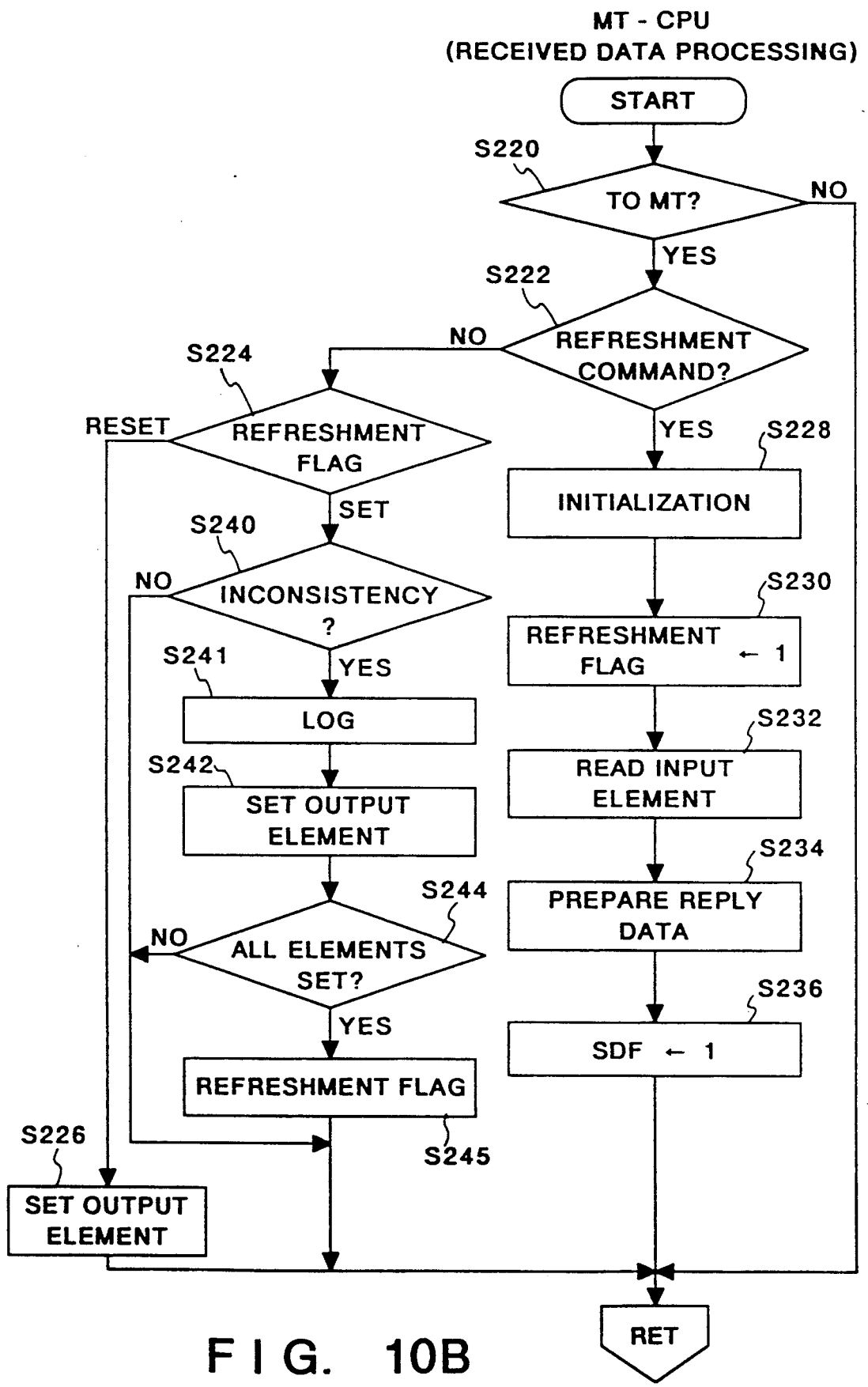
FIG. 10B is a flow chart of a control procedure of a received data processing subroutine of the CPU of the node MT.
Figure 10C:
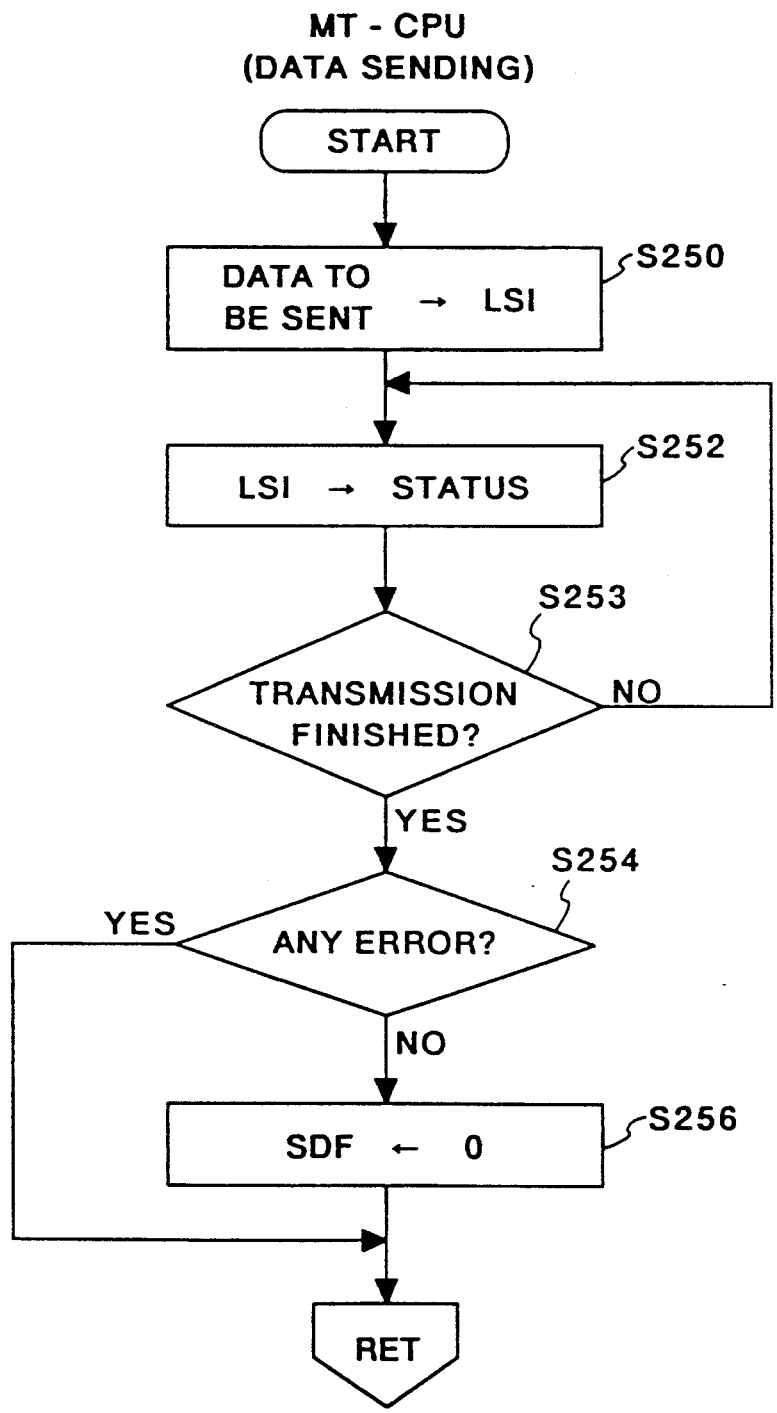
FIG. 10C is a flow chart of a control procedure of a data sending subroutine of the CPU of the node MT.

The main routine of the CPU of the node MT shown in FIG. 10A is substantially the same as that of the node TWS (FIG. 9) except for details of data sending processing of step S172 (shown in FIG. 10C) and details of received data processing (shown in FIG. 10B). The description relating to FIG. 10A is omitted.

First, a process conducted after the CPU of the node MT has received from its LSI module frame data indicating that the door switch 20 observed by the node TWS has been turned on will be described below with reference to FIG. 10B.

In step S220, examination is made as to whether or not the destination of the received frame is the node MT. In step S222, data DID is examined to determine whether the received data is a "system refreshment" command. In this situation the data is not a "system refreshment" command, and the control proceeds to step S224 to examine a refreshment flag. This refreshment flag is presently zero since it is set in step S230 described later. The control therefore proceeds to step S226. In step S226, the output device elements connected to the node MT are set according to the received data.

Figure 12:
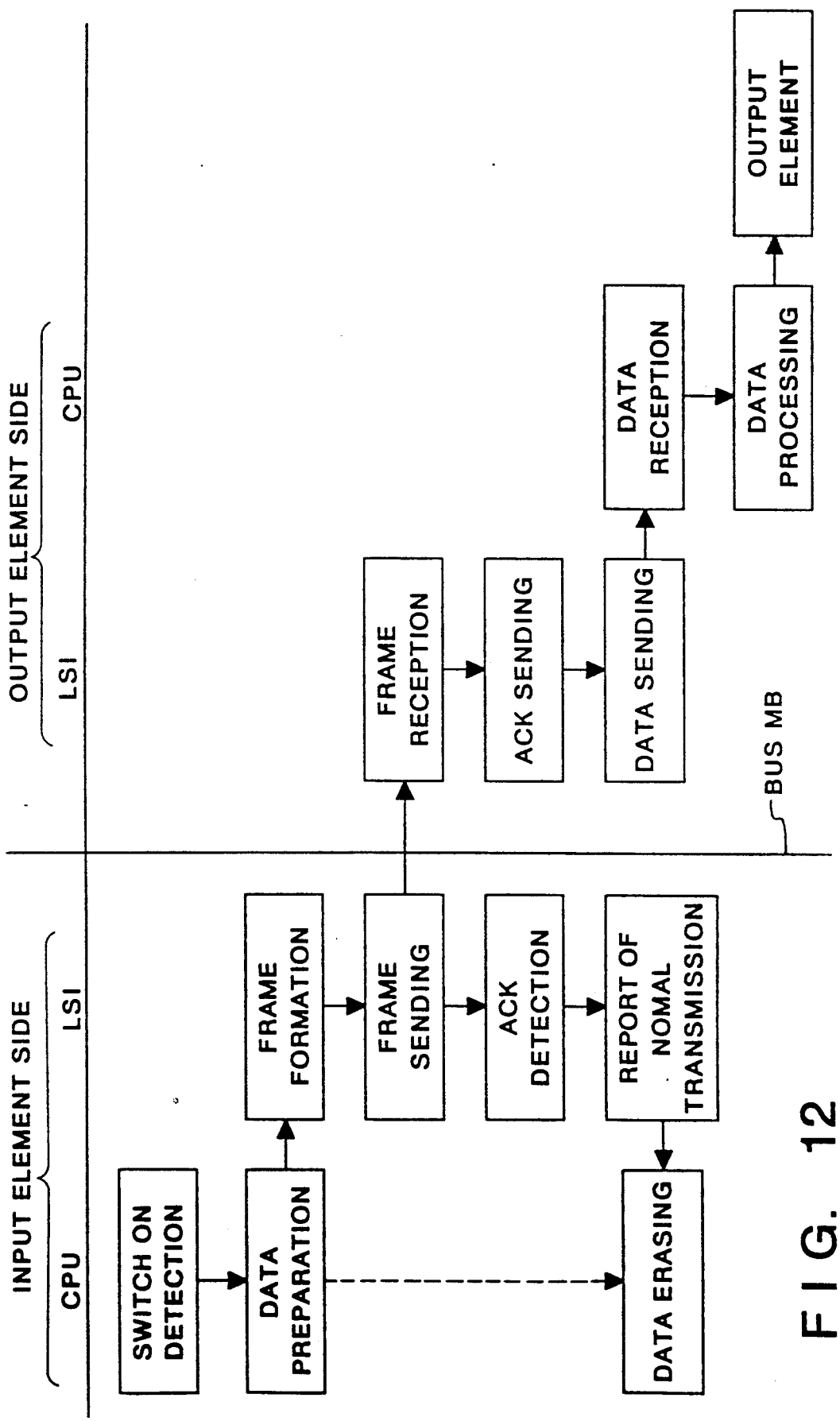
FIG. 12 is a diagram of data exchange between the node controlling an input device element and the node controlling a corresponding output device element.

Thus, an ordinary sequence of operations is completed in which a frame including information that the door switch 20 observed by the node TWS has been turned on is transmitted from the node TWS to the node MT to make the node MT light the door warning lamp 21 corresponding to this door switch. FIG. 12 schematically shows data flow between nodes relating to operations other than "system refreshment" operations.

Next, a process from the generation of "system refreshment" command to the reception of a reply frame will be described below. FIG. 14 schematically shows the "system refreshment" operation.

Re-transmission Time-Over

A procedure which is started when time-over in some of the nodes including the node TWS is detected by the node TWS and which is terminated when "system refreshment" command is sent from the node TWS to the other nodes will be described below.

This time-over is detected in step S90 (FIG. 9B) by the node TWS. If time-over has occurred with respect to at least one of the nodes, a "system refreshment command sending" subroutine is executed in step S92 (FIG. 9B). Details of this subroutine are shown in FIG. 9BA.

In step S100 of the flow chart shown in FIG. 9BA, data of "system refreshment" command is prepared. In step S102, this data is sent to the LSI module of the node TWS. The format of "system refreshment" command is the one shown in FIG. 6C, in which DID (corresponding to the frame ID shown in FIG. 3) is zero. In step S104, the log is cleared. This is because the status of the whole system is returned to the initial state by the "system refreshment" operation. In step S106, a refreshment flag is set. This flag is used in step S134 described below.

After the subroutine for "system refreshment command sending" of step S92 has been executed, a subroutine for "reply frame sending" with respect to the "system refreshment" command to the other nodes is executed in step S94 (FIG. 9B). This is because the node TWS has the features of the ordinary node, and because, for example, it is necessary to inform the node MT of the state of the switch 20. "Reply frame" of the node TWS is characterized as a response to the occurrence of a state necessitating "system refreshment" command rather than a reply to the "system refreshment" command. In this sense, it may be called "response frame" as shown in FIG. 14.

Details of this reply frame sending subroutine are shown in FIG. 9BB. First, in step S110, the states of the input device elements connected to the node TWS are read. In step S112, reply data for the node TWS itself is prepared. In step S114, a sent data flag SDF is set. Then, in steps S40 and S42 (FIG. 9A), sending of this reply data to the LSI is waited.

If the node TWS detects that the number of its errors exceeds the predetermined number or that number of ACK errors of some of the other nodes exceeds the predetermined number, the node TWS sends "system refreshment" command in the form of a frame to all the nodes and also sends the states of its input device elements in the form of a reply frame to the node which needs to be informed of the states, e g., the node MT.

Reception of "System Refreshment"]Command

If YES in step S222 (FIG. 10B) on the node MT side, initialization of the CPU and the LSI of the node MT is effected in step S228. The refreshment flag is set in step S230, and the states of all the input device elements connected to the node MT are read in step S232. In step S234, data for a reply frame sent in response to "system refreshment" command is prepared. This data includes priority data (MP/NID), the above read data and the function address of the destination node. In step S236, sent data flag SDF is set.

The signals of input device elements such as switches connected to some of the nodes may be sent to other nodes. In other words, for example, the node MT may be provided with a plurality of switches from which signals must be sent to some of the other nodes, for example, the node CC and the node TWS. In such a case, the function address must be set to "8" in accordance with the table shown above.

The priority of the sent data is determined as described below. That is, higher priority is given to a reply frame sent from a node having a larger number of input device elements. This is because the states of the output device elements are determined by the signals from the input device elements. In a case where the states of elements, two input device elements $I_1$ and $I_2$ and two output device elements $O_1$ and $O_2$, are determined in the order of, for example, $I_1 \rightarrow O_1 \rightarrow I_2 \rightarrow O_2$, the highest order must be given to the node to which the input device element $I_1$ belongs.

Reception of Reply Frame

Thus, in the system shown in FIG. 2, once "system refreshment" command is supplied to the network, all the nodes having input device elements supply reply frames to the bus. That is, the node TWS sends out a reply frame (response frame) and the node MT also sends out a reply frame, as shown in FIG. 14.

The process of reply frame reception control effected by the node TWS is shown as steps S132 through S142 in FIG. 9CB. The corresponding process for the node MT is shown as step S224, and steps S240 through S245 in FIG. 10B. These processes are the same and the process for the node MT will be described below.

If a reply frame from the node TWS is received by the CPU of the node MT, determination is made in step S220 as to whether or not the destination of this frame data is the node MT. The form of reply frames is the same as that of the ordinary frame. The control therefore proceeds from step S222 to step S224.

Since the refreshment flag has been set in step S230 by the preceding "system refreshment" command reception, the control proceeds to step S240. In step S240, examination is made as to whether there is any inconsistency between the data of the reply frame on the states of the input device elements of the destination node and the data on the states of the output device elements of the node MT. If an inconsistency is recognized, data on this inconsistency is logged. In step S242, the state of the output device element exhibiting the inconsistency is set in accordance with the state of the input device element. In step S244, examination is made as to whether or not such output device element setting has been effected with respect to all the output device elements of the node MT. This is because there is a possibility of the input device elements corresponding to all the output device elements relating to a plurality of different nodes, and because in such a case a plurality of reply frames from the plurality of nodes must be received in different periods of time. If it is determined in step S224 that the setting has been effected with respect to all the elements, a refreshment flag is set in step S245.

Thus, by the reply frame sent from the node TWS in response to "system refreshment" command, the output device elements of the corresponding nodes are corrected according to the states of the corresponding input device elements.

[Periodical System Refreshment]

In this system, "system refreshment" command is issued at times other than the time when the number of communication errors continuously taking place exceeds the predetermined number. That is, "system refreshment" command is sent from the node TWS to the bus 1 at intervals of 5 seconds, which command has the same format as the "system refreshment" command issued when the number of communication errors continuously taking place exceeds the predetermined number, and to which the same reply is returned from each node. Therefore the process of "system refreshment" command generation will be described below with reference to FIG. 9D alone.

The flow chart shown in FIG. 9D represents an interrupt processing routine started by interrupt signals supplied from a timer chip 11 of the node TWS (shown in FIG. 4) at intervals of 5 seconds. With the elapse of time of 5 seconds, the refreshment command sending subroutine, details of which are shown in FIG. 9BA, is executed in step S160, and a reply frame sending subroutine is executed in step S162. In step S164, a new period of time of 5 seconds is set in the timer chip 11. System refreshment is thereby effected every 5 seconds.

[Priority Control]

Frame sending priority control realized by this embodiment system will be briefly described below. This priority control resides in having preference of one of the nodes over another when data collision occurs. As mentioned above, priority is previously given to each node. This is possible because the relationship between the input and output device elements is known.

In the CSMA/CD type bus utilized as a part of the present invention, if collision between low and high levels supplied from two nodes takes place, only the low level is detected on the bus, as is well known. The node which sends the high level recognizes the occurrence of collision by detecting the low level. In the embodiment of this system, the priority code is placed next to SD bits, as shown in FIG. 3. In the priority field, a bit representing higher priority is disposed closer to SD bits. If data bits are examined successively starting from SD bits to recognize collision, the LSI module of the node which has sent a frame having the largest priority value must detect the collision first. In other words, a frame sent from the node of higher priority (having a smaller logical value) can be sent completely with a smaller possibility of errors.

In the example shown in FIG. 13, a re-start bit of the node having a priority "0011" is detected as zero, and the frame from this node is re-transmitted.

The node which has detected the collision re-transmits its frame after a pre-determined time based on the wellknown CSMA/CD algorism.

[Effects of the Embodiment]

The system in accordance with the above-described embodiment of the present invention has the following effects.

E1: When the node TWS detects that frame re-transmission is effected between nodes a number of times larger than the predetermined number owing to some communication error such as "multiplex bus error" or "node error", it sends a "system refreshment" command frame to all the nodes, and each node is reset in response to this command. Each node supplies a reply frame to the bus 1 in response to the "system refreshment" command data which reply frame contains information on the input device elements connected to the corresponding node. The destination of this reply frame is the node having output device elements corresponding to the input device elements. The node which receives this reply frame corrects the states of the output device elements according to the information on the states of the input device elements.

E1-a: By this correction, inconsistency between the states of the input and output device elements because of failure to send the desired frame owing to re-transmission time-over can be solved.

E1-b: Since the system refreshment method is adopted instead of an easy method of only increasing the re-transmission times, the reliability of coincidence between the states of input and output device elements of the system can be improved.

E2: "System refreshment" is effected periodically irrespective of the occurrence of errors, thereby making it possible to positively solve any inconsistency between input and output device elements which may be caused by failure in the detection of communication errors.

E3: A priority order is set for reply frames, thereby enabling "system refreshment" to be completed at an optimized efficiency.

[Modifications]

The present invention can be modified in various ways without departing from its cope, as described below.

M1: In the above-described embodiment, each node is controlled by the two logical control devices, i.e., the multiplex communication LSI and the host CPU to reduce the burden on each control device and to increase the throughput of the overall system. Needless to say, the present invention can be applied to a type of node in which communication control, frame data processing and input/output device element control are performed by one microprocessor in a time-sharing processing manner.

M2: The above-described node TWS has the same function of controlling input/output device elements as the ordinary node other than the function of controlling the whole network system. In accordance with the present invention, however, the node having a function of sending "system refreshment" command may be a node having, together with this function, only another function of monitoring communication errors or monitoring passage of time of 5 seconds.

M3: The ACK format of the above-described embodiment is of the special type shown in FIG. 3. However, "system refreshment" command sending in accordance with the present invention is not necessarily applied to the system of observing this special type of ACK alone. It can be applied to the conventional ACK observation system in which a node which is to receive a frame sends back ACK only when it receives this frame without any error.

M4: In the described embodiment, the priority order of relay frames is previously fixed with respect to the corresponding nodes. However, this priority order may be variable. For example, it may be contained in data of "system refreshment" command when this command is sent by the node TWS.

M5: Basically, the logging of results of inconsistency between input and output device elements effected in step S241 is used for an improvement in terms of service. It is preferable to use a non-volatile memory for storing such results.

The present invention is not limited to the above embodiments and various changes and modifications can be made within the spirit and scope of the present invention. Therefore, to apprise the public the scope of the present invention the following claims are made.

What is claimed is:

1. A multiplex transmission system for use in a vehicle wherein a plurality of multiplex communication nodes are connected to a common multiplex transmission path, the system comprising:
   (a) detection means for detecting transmission errors at said plurality of multiplex communication nodes and/or in the transmission path; and (b) wherein said plurality of multiplex communication nodes include
(b1) a plurality of first communication nodes, each first communication node having a communication control unit for controlling communication between said first communication nodes based on a decentralized multiplex protocol; and
(b2) a second communication node including at least a communication control unit for controlling communication through the overall system, said second communication node having
(b2-1) command means for commanding each of said plurality of first communication nodes to supply information on the status of the corresponding node to said transmission path, when said detection means detects an error.

2. The system according to claim 1, wherein the communication control unit of each of said plurality of first communication nodes comprises:
means for receiving the command via the transmission path from said second communication node;
means for receiving status information in a frame format via the transmission path from other first communication nodes after receiving the command from said second communication node;
means for analyzing the received status information; and
initialization means for initializing itself according to the results of analysis of the status information.

3. The system according to claim 1, wherein said detection means includes means for observing the number of times of re-transmission of re-transmitted data supplied to said multiplex transmission path, and recognizes an error if the number of re-transmission times exceeds a predetermined number.

4. The system according to claim 1, wherein said first communication nodes are for electrical equipment elements of the vehicle, and the status information includes information on the status of the electrical equipment elements.

5. The system according to claim 2, wherein said first communication nodes are for electrical equipment elements of the vehicle, and the status information includes information on the status of the electrical equipment elements.

6. The system according to claim 5, wherein
the electrical equipment elements of some of the first communication nodes include an input device;
the electrical equipment elements of some of the first communication nodes include an output device; and
wherein in a normal operation, the output device is actuated in accordance with data transmitted from the first communication node which includes said input device; and
the status information includes information on the status of the input device.

7. The system according to claim 6, wherein said input device is a switch or sensor, and said output device is an actuator or lamp.

8. The system according to claim 7, wherein the initialization means of said node for the electrical equipments including the output device initializes the corresponding output device in correspondence with the information on the status of the input device contained in the status information received.

9. The system according to claim 2, wherein each of said plurality of first nodes comprises:
means for transmitting the status information in the form of a frame containing information on a priority order for arbitrating a collision of data occurring on said transmission path;
means for detecting the collision of data on said transmission path; and
means for re-transmitting the frame containing the status information in accordance with the priority order, when the collision is detected.

10. The system according to claim 9, wherein if some of said plurality of first communication nodes include a node for electrical equipment elements having an input device, and another node for electrical equipment elements having an output device corresponding to the input device, a relatively high priority order is given to the node for the electrical equipment elements having the input device.

11. The system according to claim 2, wherein the analyzing means of the communication control unit of the first communication node further includes means for detecting status data in the received status information addressed to the first communication node; and said initialization means initializes the first communication node in accordance with the detected status data.

12. A multiplex transmission system for use in a vehicle comprising:
(a) observation means for observing passage of a predetermined period of time; and
(b) a plurality of multiplex communication nodes mutually connected by a common multiplex transmission path, said plurality of multiplex communication nodes including;
(b1) a plurality of first communication nodes, each first communication node having a communication control unit for controlling communication between said first communication nodes based on a decentralized multiplex protocol; and
(b2) a second communication node including at least a communication control unit for controlling communication through the overall system, said second communication node having;
(b2-1) command means for commanding each of said plurality of first communication nodes to transmit information on the status of the corresponding node to said transmission path, when said observation means detects passage of the predetermined period of time.

13. The system according to claim 12, wherein the communication control unit of each of said plurality of first communication nodes comprises:
means for receiving the command via the transmission path from said second communication node;
means for receiving status information in a frame format via the transmission path from other first communication nodes after receiving the command from said second communication node;
means for analyzing the received status information; and
initialization means for initializing itself according to the results of analysis of the status information.

14. The system according to claim 12, wherein said first communication nodes are for electrical equipment elements of the vehicle, and the status information includes information on the status of the electrical equipment elements.

15. The system according to claim 13, wherein said first communication nodes are for electrical equipment elements of the vehicle, and the status information includes information on the status of the electrical equipment elements.

16. The system according to claim 15, wherein the electrical equipment elements include an input device such as a switch or a sensor, and the status information includes information on the status of the input device.

17. The system according to claim 15, wherein some of said plurality of first communication nodes comprise:
a node for electrical equipment elements including the input device; and
another node for electrical equipments including an output device such as an actuator corresponding to the input device.

18. The system according to claim 17, wherein the initialization means of said node for the electrical equipments including the output device initializes the corresponding output device in correspondence with the information on the status of the input device contained in the status information received.

19. The system according to claim 13, wherein each of said plurality of first nodes comprises:
means for sending the status information in the form of a frame containing information on a priority order for arbitrating a collision of data occurring on said transmission path;
means for detecting the collision of data on said transmission path; and
means for re-transmitting the frame containing the status information in accordance with the priority order, when the collision is detected.

20. The system according to claim 19, wherein if some of said plurality of first communication nodes include a node for electrical equipment elements having an input device, and another node for electrical equipment elements having an output device corresponding to the input device, a relatively high priority order is given to the node for the electrical equipment elements having the input device.

* * * * *